United States Patent
Park et al.

(10) Patent No.: US 11,973,605 B2
(45) Date of Patent: Apr. 30, 2024

(54) METHOD AND DEVICE FOR DETERMINING TRANSMISSION TIME IN WIRELESS COMMUNICATION SYSTEM

(71) Applicant: Samsung Electronics Co., Ltd., Gyeonggi-do (KR)

(72) Inventors: Sungjin Park, Gyeonggi-do (KR); Younsun Kim, Gyeonggi-do (KR); Hyunseok Ryu, Gyeonggi-do (KR); Jonghyun Bang, Gyeonggi-do (KR); Jeongho Yeo, Gyeonggi-do (KR); Jinyoung Oh, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 288 days.

(21) Appl. No.: 17/263,768

(22) PCT Filed: Jul. 26, 2019

(86) PCT No.: PCT/KR2019/009363
§ 371 (c)(1),
(2) Date: Jan. 27, 2021

(87) PCT Pub. No.: WO2020/022850
PCT Pub. Date: Jan. 30, 2020

(65) Prior Publication Data
US 2021/0184804 A1 Jun. 17, 2021

(30) Foreign Application Priority Data

Jul. 27, 2018 (KR) .................. 10-2018-0088158
Jan. 15, 2019 (KR) .................. 10-2019-0005382
May 10, 2019 (KR) .................. 10-2019-0055169

(51) Int. Cl.
*H04L 1/1867* (2023.01)
*H04L 5/00* (2006.01)

(52) U.S. Cl.
CPC .......... *H04L 1/1887* (2013.01); *H04L 5/0078* (2013.01)

(58) Field of Classification Search
CPC .......................... H04L 1/1887; H04L 5/0078
See application file for complete search history.

(56) References Cited

U.S. PATENT DOCUMENTS

| | | |
|---|---|---|
| 10,355,828 B2 | 7/2019 | Vajapeyam et al. |
| 2015/0016318 A1 | 1/2015 | Lee et al. |

(Continued)

FOREIGN PATENT DOCUMENTS

| | | |
|---|---|---|
| CN | 104247373 | 12/2014 |
| CN | 108270539 | 7/2018 |

(Continued)

OTHER PUBLICATIONS

Huawei, HiSilicon, "Remaining Issues on HARQ Management", R1-1802697, 3GPP TSG RAN WG1 Meeting #92, Feb. 26-Mar. 2, 2018, 15 pages.

(Continued)

*Primary Examiner* — Michael Thier
*Assistant Examiner* — Nevena Zecevic Sandhu
(74) *Attorney, Agent, or Firm* — The Farrell Law Firm, P.C.

(57) ABSTRACT

The disclosure relates to a method and apparatus for transmitting or receiving control information and data information in a wireless communication system, and in an embodiment of the disclosure, a method of identifying transmission timing of a terminal in a wireless communication system includes receiving a first signal from a base station, determining whether an out-of-order hybrid automatic repeat request (HARQ) process occurs, determining transmission timing of a second signal, which is a response to the first signal, to include a processing time of the out-of-order (Continued)

HARQ process when the out-of-order HARQ process occurs, and transmitting the second signal at the determined transmission timing.

18 Claims, 18 Drawing Sheets

(56) References Cited

U.S. PATENT DOCUMENTS

| | | | |
|---|---|---|---|
| 2015/0156669 A1 | 6/2015 | Quan et al. | |
| 2016/0323070 A1 | 11/2016 | Chen et al. | |
| 2017/0288819 A1 | 10/2017 | Chen et al. | |
| 2020/0374042 A1* | 11/2020 | Feng | H04L 1/1854 |
| 2022/0116151 A1 | 4/2022 | Wang et al. | |

FOREIGN PATENT DOCUMENTS

| | | |
|---|---|---|
| KR | 1020170125333 | 11/2017 |
| WO | WO 2013/147490 | 10/2013 |
| WO | WO 2018/106075 | 6/2018 |

OTHER PUBLICATIONS

Huawei, HiSilicon, "Remaining Issues on Scheduling and HARQ", R1-1805888, 3GPP TSG RAN WG1 Meeting #93, May 21-25, 2018, 12 pages.
European Search Report dated Jul. 27, 2021 issued in counterpart application No. 19842261.0-1205, 7 pages.
3GPP, 3rd Generation Partnership Project; Technical Specification Group Radio Access Network; Medium Access Control (MAC) Protocol Specification (Release 15), 3GPP TS 25.321 v15.0.0, Jun. 2018, 212 pages.
3GPP, 3rd Generation Partnership Project; Technical Specification Group Radio Acess Network; Enhanced Uplink; Overall Description; Stage 2 (Release 15), 3GPP Ts 25.319 V15.0.0, Jun. 2018, 93 pages.
International Search Report dated Oct. 29, 2019 issued in counterpart application No. PCT/KR2019/009363, 17 pages.
European Search Report dated Mar. 31, 2023 issued in counterpart application No. 19842261.0-1213, 5 pages.
Indian Hearing Notice dated Jan. 31, 2024 issued in counterpart application No. 202137006957, 3 pages.
Chinese Office Action dated Sep. 15, 2023 issued in counterpart application No. 201980061369.4, 16 pages.

* cited by examiner

METHOD AND DEVICE FOR DETERMINING TRANSMISSION TIME IN WIRELESS COMMUNICATION SYSTEM

PRIORITY

This application is a National Phase Entry of PCT International Application No. PCT/KR2019/009363 which was filed on Jul. 26, 2019, and claims priority to Korean Patent Application Nos. 10-2018-0088158, 10-2019-0005382 and 10-2019-0055169, which were filed in the Korean Intellectual Property Office on Jul. 27, 2018, Jan. 15, 2019 and May 10, 2019, respectively, the content of each of which is incorporated herein by reference in its entirety.

TECHNICAL FIELD

The disclosure relates to a method and apparatus for transmitting or receiving control information and data information in a wireless communication system.

BACKGROUND ART

To meet demand due to ever-increasing wireless data traffic since the commercialization of the 4th (4G) communication system, there have been efforts to develop an advanced 5th generation (5G) system or pre-5G communication system. For this reason, the 5G or pre-5G communication systems are also called 'beyond 4G network' communication systems or post long term evolution (LTE) systems. The 5G communication system defined by the 3rd Generation Partnership Project (3GPP) is called a new radio (NR) system. Implementation of the 5G communication system using ultra-frequency (millimeter wave (mmWave)) bands, e.g., 60 GHz bands, is considered to achieve higher data rates. To reduce propagation loss of radio waves and increase a transmission range of radio waves in the ultra-frequency bands, beamforming, massive multiple-input multiple-output (massive MIMO), full dimensional MIMO (FD-MIMO), array antenna, analog beamforming, and large-scale antenna techniques have been discussed and applied to the NR system. To improve system networks, technologies for advanced small cells, cloud radio access networks (RANs), ultra-dense networks, device to device (D2D) communication, wireless backhaul, moving networks, cooperative communication, coordinated multi-points (CoMP), reception-end interference cancellation and the like are also being developed in the 5G communication system. In addition, in the 5G system, advanced coding modulation (ACM) schemes, such as hybrid frequency-shift keying (FSK) and quadrature amplitude modulation (QAM) modulation (FQAM) and sliding window superposition coding (SWSC), and advanced access technologies, such as filter bank multi carrier (FBMC), non-orthogonal multiple access (NOMA), and sparse code multiple access (SCMA) are being developed.

In the meantime, the Internet is evolving from a human-oriented connectivity network where humans generate and consume information to an Internet of Things (IoT) network where distributed entities or things send, receive and process information without human intervention. Internet of Everything (IoE) technologies combined with IoT, such as big data processing technologies through connection with a cloud server, for example, have also emerged. To implement IoT, various technologies, such as a sensing technology, a wired/wireless communication and network infrastructure, a service interfacing technology, and a security technology are required, and recently, even technologies for sensor networks, machine to machine (M2M) communication, machine type communication (MTC) for connection between things are being studied. Such an IoT environment may provide intelligent Internet Technology (IT) services that create new value to human life by collecting and analyzing data generated among connected things. IoT may be applied to a variety of areas, such as smart homes, smart buildings, smart cities, smart cars or connected cars, smart grids, health care, smart home appliances and advanced medical services through convergence and combination between existing Information Technologies (IT) and various industrial applications.

In this regard, various attempts to apply the 5G communication system to the IoT network are being made. For example, technologies regarding sensor networks, M2M, MTC, etc., are implemented by the 5G communication technologies, such as beamforming, MIMO, array antenna schemes, etc. Even application of a cloud radio access network (cloud RAN) as the aforementioned big data processing technology may be an example of convergence of 5G and IoT technologies.

With the development of the aforementioned technologies and wireless communication systems, it is possible to provide various services, and there is a need for a method to provide the services effectively.

DESCRIPTION OF EMBODIMENTS

Technical Problem

Embodiments of the disclosure may effectively provide services in a wireless communication system.

Technical Solution to Problem

According to an embodiment of the disclosure, a method of determining transmission timing of a terminal in a wireless communication system includes receiving a first signal from a base station; identifying whether an out-of-order hybrid automatic repeat request (HARQ) process occurs, determining transmission timing of a second signal, which is a response to the first signal, to include a processing time of the out-of-order HARQ process when the out-of-order HARQ process occurs; and transmitting the second signal at the determined transmission timing.

According to another embodiment of the disclosure, a terminal in a wireless communication system includes a transceiver configured to transmit or receive a signal to or from a base station; a memory storing a program and data for determining transmission timing of the terminal; and a processor configured to execute the program stored in the memory to receive a first signal from the base station, identify whether an out-of-order HARQ process occurs, determine transmission timing of a second signal, which is a response to the first signal, to include a processing time of the out-of-order HARQ process when the out-of-order HARQ process occurs, and transmit the second signal at the determined transmission timing.

Advantageous Effects of Disclosure

According to embodiments of the disclosure, services may be effectively provided in a wireless communication system.

BEST MODE

Figure 1:
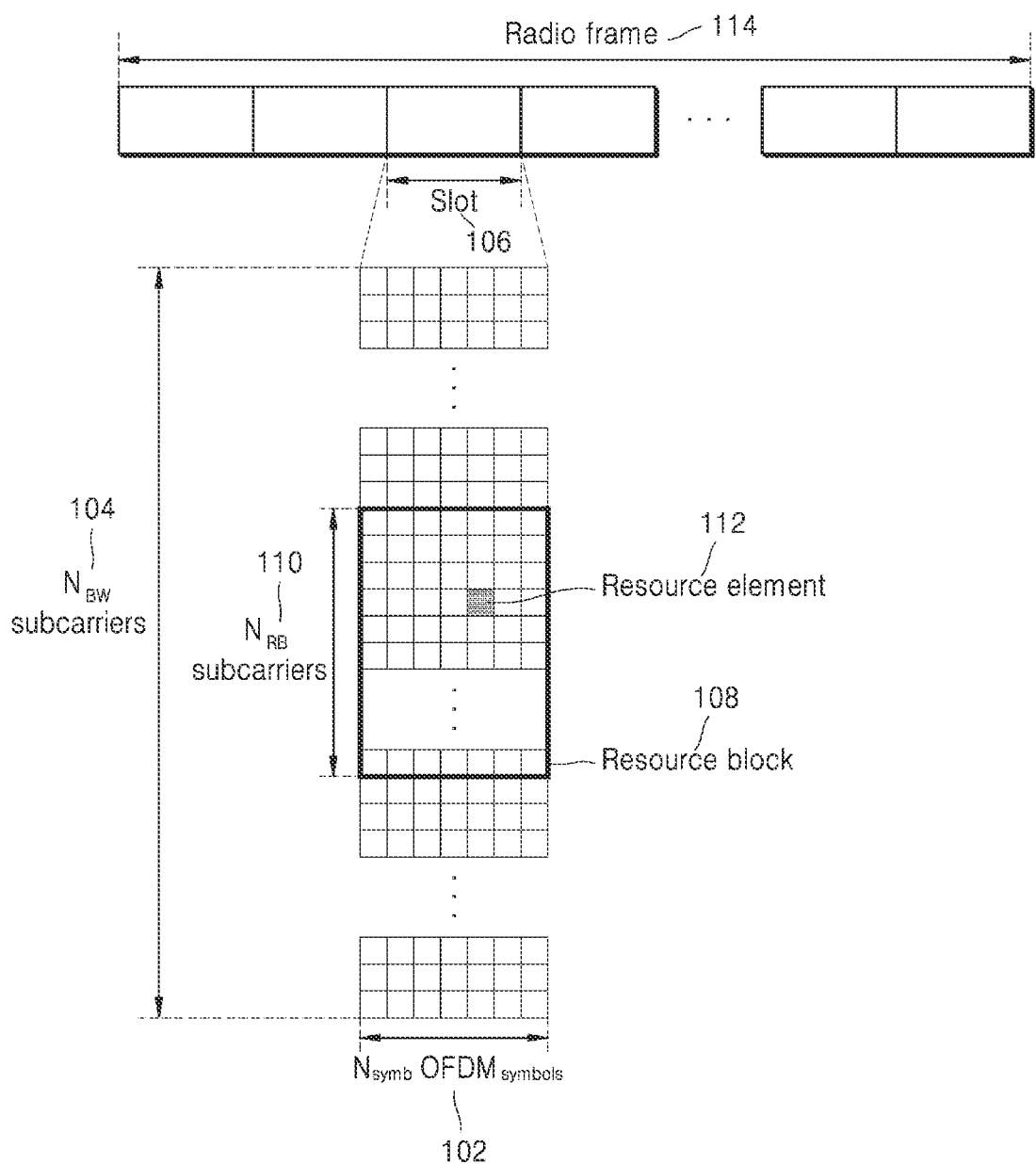
FIG. 1 illustrates a transport structure of the time-frequency domain, which is a radio resource region of a 5th generation (5G) or new radio (NR) system.

According to an embodiment of the disclosure, a method of determining transmission timing of a terminal in a wireless communication system includes: receiving a first signal from a base station; identifying whether an out-of-order hybrid automatic repeat request (HARQ) process occurs, determining transmission timing of a second signal, which is a response to the first signal, to include a processing time of the out-of-order HARQ process when the out-of-order HARQ process occurs; and transmitting the second signal at the determined transmission timing.

The determining of the transmission timing of the second signal, which is the response to the first signal, to include the processing time of the out-of-order HARQ process when the out-of-order HARQ process occurs may include: determining whether a number of out-of-order HARQ processes which the terminal is able to support is exceeded, when the out-of-order HARQ process occurs; and when the number of out-of-order HARQ processes which the terminal is able to support is exceeded, ignoring transmission of the second signal corresponding to the first signal or transmitting invalid information for an HARQ process beyond the number of HARQ processes which the terminal is able to support, and determining transmission timing of the second signal to include a processing time of the out-of-order HARQ process for an HARQ process within the number of HARQ processes which the terminal is able to support.

The method may further include: determining transmission timing of the second signal without including a processing time of the out-of-order HARQ process, when the out-of-order HARQ process does not occur; and transmitting the second signal at the determined transmission timing.

The determining of the transmission timing of the second signal, which is the response to the first signal, to include the processing time of the out-of-order HARQ process when the out-of-order HARQ process occurs may include determining transmission timing of the second signal to include a processing time of the out-of-order HARQ process when the number of out-of-order processes which the terminal is able to support is not exceeded.

The identifying of whether the out-of-order HARQ occurs may include, when a start Orthogonal Frequency Division Multiplexing (OFDM) symbol of the first signal of a second HARQ process is received later than a start OFDM symbol of the first signal of a first HARQ process, and a start OFDM symbol of the second signal of the second HARQ process is transmitted earlier than a start OFDM symbol of the second signal of the second HARQ process, determining that the out-of-order HARQ occurs with respect to the first HARQ process, and the first HARQ process may have an earlier index than the second HARQ process.

The identifying of whether the out-of-order HARQ occurs may include, in comparing the start OFDM symbols of the first signal and the second signal of the first HARQ process with the start OFDM symbols of the first signal and the second signal of the second HARQ process, comparing at least one or more of points in time at which the respective OFDM symbols start and points in time at which the respective OFDM symbols end.

The method may further include: determining whether a Downlink Control Information (DCI) format of the first signal of a second HARQ process and a DCI format of the first signal of a first HARQ process are the same; when the DCI format of the first signal of the second HARQ process and the DCI format of the first signal of the first HARQ process are the same, not performing out-of-order HARQ and determining transmission timing of the second signal without including processing time of the out-of-order HARQ process; and transmitting the second signal at the determined transmission timing.

The method may further include, when the DCI format of the first signal of the second HARQ process and the DCI format of the first signal of the first HARQ process are not same, performing an out-of-order HARQ and determining transmission timing of the second signal to include processing time of the out-of-order HARQ process; and transmitting the second signal at the determined transmission timing.

According to another embodiment of the disclosure, a terminal in a wireless communication system includes: a transceiver configured to transmit or receive a signal to or from a base station; a memory storing a program and data for determining transmission timing of the terminal; and a processor configured to execute the program stored in the memory to receive a first signal from the base station, identify whether an out-of-order HARQ process occurs, determine transmission timing of a second signal, which is a response to the first signal, to include a processing time of the out-of-order HARQ process when the out-of-order HARQ process occurs, and transmit the second signal at the determined transmission timing.

The processor may be further configured to determine whether a number of out-of-order HARQ processes which the terminal is able to support is exceeded when the out-of-order HARQ process occurs, and when the number of out-of-order HARQ processes which the terminal is able to support is exceeded, ignore transmission of the second signal corresponding to the first signal or transmitting invalid information for an HARQ process beyond the number of HARQ processes which the terminal is able to support, and determine transmission timing of the second signal to include a processing time of the out-of-order HARQ process for an HARQ process within the number of HARQ processes which the terminal is able to support.

The processor may be further configured to determine transmission timing of the second signal without including a processing time of the out-of-order HARQ process, when the out-of-order HARQ process does not occur, and transmit the second signal at the determined transmission timing.

The processor may be further configured to determine transmission timing of the second signal to include a processing time of the out-of-order HARQ process when the number of out-of-order processes which the terminal is able to support is not exceeded.

The processor may be further configured to, when a start OFDM symbol of the first signal of a second HARQ process is received later than a start OFDM symbol of the first signal of a first HARQ process, and a start OFDM symbol of the second signal of the second HARQ' process is transmitted earlier than a start OFDM symbol of the second signal of the second HARQ process, determine that the out-of-order HARQ occurs with respect to the first HARQ process, and the first HARQ process may have an earlier index than the second HARQ process.

The processor may be further configured to identify whether the out-of-order HARQ occurs, and in comparing the start OFDM symbols of the first signal and the second signal of the first HARQ process with the start OFDM symbols of the first signal and the second signal of the second HARQ process, compare at least one or more of points in time at which the respective OFDM symbols start and points in time at which the respective OFDM symbols end.

The processor may be further configured to determine whether a DCI format of the first signal of a second HARQ process and a DCI format of the first signal of a first HARQ process are the same, when the DCI format of the first signal of the second HARQ process and the DCI format of the first signal of the first HARQ process are the same, not perform out-of-order HARQ and determine transmission timing of the second signal without including processing time of the out-of-order HARQ process, and when the DCI format of the first signal of the second HARQ process and the DCI format of the first signal of the first HARQ process are not same, perform an out-of-order HARQ, determine transmission timing of the second signal to include a processing time of the out-of-order HARQ process, and transmit the second signal at the determined transmission timing.

MODE OF DISCLOSURE

Embodiments will now be described with reference to accompanying drawings.

Technological content well-known in the art or not directly related to the disclosure is omitted in the following description. Through the omission of content that might otherwise obscure the subject matter of the disclosure, the subject matter will be understood more clearly.

For the same reason, some parts in the accompanying drawings are exaggerated, omitted or schematically illustrated. The size of the respective elements may not fully reflect their actual size. Like numbers refer to like elements throughout the drawings.

Advantages and features of the disclosure, and methods for achieving them will be understood more clearly when the following embodiments are read with reference to the accompanying drawings. The embodiments of the disclosure may, however, be embodied in many different forms and should not be construed as limited to the embodiments set forth herein; rather, these embodiments are provided so that this disclosure will be thorough and complete, and will fully convey the scope of the embodiments of the disclosure to those of skill in the art. Like numbers refer to like elements throughout the specification.

It will be understood that each blocks and combination of the blocks of a flowchart may be performed by computer program instructions. The computer program instructions may be loaded on a processor of a universal computer, a special-purpose computer, or other programmable data processing equipment, and thus they generate means for performing functions described in the block(s) of the flowcharts when executed by the processor of the computer or other programmable data processing equipment. The computer program instructions may also be stored in computer-usable or computer-readable memories oriented for computers or other programmable data processing equipment, so it is possible to manufacture a product that contains instruction means for performing functions described in the block(s) of the flowchart. The computer program instructions may also be loaded on computers or programmable data processing equipment, so it is possible for the instructions to generate a process executed by the computer or the other programmable data processing equipment to provide steps for performing functions described in the block(s) of the flowchart.

Furthermore, each block may represent a part of a module, segment, or code including one or more executable instructions to perform particular logic function(s). It is noted that the functions described in the blocks may occur out of order in alternate embodiments. For example, two successive blocks may be performed substantially at the same time or in reverse order.

The term "module" (or sometimes "unit") as used herein refers to a software or hardware component, such as field programmable gate array (FPGA) or application specific integrated circuit (ASIC), which performs some functions. However, the module is not limited to software or hardware. The module may be configured to be stored in an addressable storage medium, or to execute one or more processors. For example, the modules may include components, such as software components, object-oriented software components, class components and task components, processes, functions, attributes, procedures, subroutines, segments of program codes, drivers, firmware, microcodes, circuits, data, databases, data structures, tables, arrays, and variables. Functions served by components and modules may be combined into a less number of components and modules, or further divided into a more number of components and modules. Moreover, the components and modules may be implemented to execute one or more central processing units (CPUs) in a device or security multimedia card. In embodiments, the module may include one or more processors.

Wireless communication systems are evolving from early systems that provide voice-oriented services to broadband wireless communication systems that provide high data rate and high quality packet data services such as 3GPP high speed packet access (HSPA), long term evolution (LTE) or evolved universal terrestrial radio access (E-UTRA), LTE-advanced (LTE-A), 3GPP2 high rate packet data (HRPD), ultra mobile broadband (UMB), and IEEE 802.16e communication standards. Furthermore, for the fifth generation (5G) wireless communication system, communication standards for 5G or new radio (NR) are being made.

As a representative example of a wide band wireless communication system, the 5G or NR system employs orthogonal frequency division multiplexing schemes for downlink (DL) and uplink (UL). Specifically, a cyclic prefix OFDM (CP-OFDM) scheme is employed for DL, and together with the CP-OFDM, discrete Fourier transform spreading OFDM (DFT-S-OFDM) scheme is employed for UL. The UL refers to a radio link for a terminal (or user equipment (UE) or mobile station (MS)) to transmit data or a control signal to a base station (BS, or gNode B or eNode B), and the DL refers to a radio link for a BS to transmit data or a control signal to a terminal. Such a multiple access scheme allocates and operates time-frequency resources for carrying data or control information for respective users not to overlap each other, i.e., to maintain orthogonality, thereby differentiating each users data or control information.

The 5G or NR system adopts a Hybrid Automatic Repeat request (HARQ) scheme that re-transmits corresponding data through a physical layer in a case that decoding fails at the initial stage of transmission. By the HARQ scheme, if a receiver fails to correctly decode data, the receiver transmits information indicating the decoding failure (NACK; Negative Acknowledgment) to a transmitter so that the transmitter may re-transmit the corresponding data through the physical layer. The receiver increases data reception capability by combining the data re-transmitted by the transmitter with the data for which decoding has failed. Further, in a case that the receiver correctly decodes data, the receiver may transmit information indicating decoding success (ACK; Acknowledgment) to the transmitter so that the transmitter may transmit new data.

In the meantime, an NR system for new 5G communication is designed to freely multiplex various services in time and frequency resources, so that a waveform/numerology or the like, and a reference signal or the like, may be dynamically or freely allocated as required for the corresponding service. For wireless communication to provide a best service to a UE, it is important to optimize data transmission through measurement of quality and interference of a channel, and accordingly, channel state measurement is essential. However, unlike the fourth generation (4G) communication where channel and interference properties are not significantly changed depending on frequency resources, a 5G or NR channel has channel and interference properties that significantly change depending on services and is thus required to support a frequency resource group (FRG)-wise subset, which enables division of the measurement. In the meantime, service types supported in the 5G or NR system may be divided into categories, such as Enhanced Mobile BroadBand (eMBB), massive Machine Type Communications (mMTC), Ultra-Reliable and Low-Latency Communications (URLLC), etc. The eMBB is a service for high rate transmission of high volume data, the mMTC is a service for least power consumption at the UE and accesses of multiple UEs, and the URLLC is a service for high reliability and low latency, without being limited thereto. Depending on the type of service applied to the UE, different requirements may be applied.

In the disclosure, a first signal may refer to a signal that expects a response from the UE among signals transmitted by a BS to the UE, and a second signal may refer to a response signal of the UE that has received the first signal. Specifically, the first signal may be a UL scheduling grant signal and a DL data signal. The second signal may be a UL data signal for UL scheduling grant and an HARQ ACK/NACK for a DL data signal.

In the disclosure, service types that require the first signal may include eMBB, mMTC, URLCC services, and the like. It is, however, an example, and the service type requiring the first signal in the disclosure is not limited to the aforementioned services.

In the disclosure, length of a transmission time interval (TTI) of the first signal may refer to length of a period of time in which the first signal is transmitted. Also, length of a TTI of the second signal may refer to length of a period of time in which the second signal is transmitted.

In the disclosure, second signal transmission timing is information about when a UE transmits the second signal and when a BS receives the second signal, and may be used to have the same meaning as second signal transmission/reception timing.

In the disclosure, the conventional terms 'physical channel' and 'signal' may be interchangeably used with data or a control signal. For example, a physical downlink shared channel (PDSCH) is a physical channel on which to transmit data, but in the disclosure, the PDSCH may also be called data.

In the disclosure, higher layer signaling is a method of transferring a signal to the UE from the BS on a DL data channel of the physical layer or to the BS from the UE on a UL data channel of the physical layer, and may also be referred to as RRC signaling or an MAC control element (CE).

Hereinafter, embodiments of the disclosure will be described in detail with reference to the accompanying drawings. In the description of the disclosure, when it is determined that a detailed description of related functions or configurations may unnecessarily obscure the subject matter of the disclosure, the detailed description will be omitted. Further, terms, as will be mentioned later, are defined by taking functionalities in the disclosure into account, but may vary depending on practices or intentions of users or operators. Accordingly, the terms should be defined based on the descriptions throughout this specification. In the following description, a base station is an entity for performing resource allocation for a UE, and may be at least one of a gNB, an eNB, a Node B, a BS, a radio access unit, a base station controller (BSC), and a network node. A terminal may include a user equipment (UE), a mobile station (MS), a cellular phone, a smart phone, a computer, or a multimedia system capable of performing a communication function. Herein, downlink (DL) refers to a radio transmission path for a signal transmitted from a BS to a UE, and uplink (UL) refers to a radio transmission path for a signal transmitted from a UE to a BS. Furthermore, although an NR system will be described as an example in the disclosure, it is not limited thereto and embodiments of the disclosure may also be applied to other various communication systems having a similar technical background or channel type. Furthermore, embodiments of the disclosure will also be applied to different communication systems with some modifications to such an extent that does not significantly deviate the scope of the disclosure when judged by skilled people in the art.

In the meantime, as a study on next generation communication systems is being conducted these days, various schemes for scheduling communication with a UE are being discussed. Hence, an efficient scheduling and data transmission/reception scheme in consideration of characteristics of the next generation communication system is required.

In the next generation communication system, a plurality of services may be provided for a user, and to provide such a plurality of services for the user, a method of providing the respective services to fit their characteristics in a same time interval and a corresponding apparatus are required.

FIG. 1 illustrates a transport structure of the time-frequency domain, which is a radio resource region of a 5G or NR system.

Referring to FIG. 1, in the radio resource region, the horizontal axis represents the time domain, and the vertical axis represents the frequency domain. A minimum transmission unit in the time domain is an OFDM symbol, and $N_{symb}$ OFDM symbols 102 together define a slot 106. A subframe may be defined to be 1.0 ms long, and a radio frame 114 may be defined to be 10 ms long. A minimum transmission unit in the frequency domain is a subcarrier, and bandwidth of the whole system transmission band may be comprised of a total of $N_{BW}$ subcarriers 104. These specific numerical values may be, however, variously applied depending on the system.

A basic unit in the time-frequency resource region is a resource element 112 (RE), which may be represented by an OFDM symbol index and a subcarrier index. A resource block (RB) 108 or a physical resource block (PRB) may be defined with $N_{symb}$ successive OFDM symbols 102 in the time domain and $N_{RB}$ successive subcarriers 110 in the frequency domain. Accordingly, one RB 108 may be comprised of includes $N_{symb} \times N_{RB}$ REs 112.

Generally, a minimum transmission unit of data is an RB. In the 5G or NR system, it is common that $N_{symb}=14$, $N_{RB}=12$, and $N_{BW}$ and $N_{RB}$ may be proportional to the bandwidth of a system transmission band. Data rate increases in proportion to the number of RBs scheduled for the UE. In the 5G or NR system, for an FDD system differentiating and operating DL and UL by frequency, DL transmission bandwidth may differ from UL transmission bandwidth. Channel bandwidth refers to RF bandwidth corresponding to the system transmission bandwidth. Table 1 represents correspondence between system transmission bandwidth and channel bandwidth defined in an LTE system for 4G wireless communication before the 5G or NR system. For example, the LTE system having 10 MHz channel bandwidth has transmission bandwidth of 50 RBs.

TABLE 1

| Channel bandwidth $BW_{Channel}$ [MHz] | 1.4 | 3 | 5 | 10 | 15 | 20 |
|---|---|---|---|---|---|---|
| Transmission bandwidth configuration NRB | 6 | 15 | 25 | 50 | 75 | 100 |

The 5G or NR system may be operated in wider channel bandwidth than the channel bandwidth for LTE presented in table 1. Table 2 represents correspondence between system transmission bandwidth, channel bandwidth, and subcarrier spacing (SCS) in the 5G or NR system.

TABLE 2

| | SCS [kHz] | Channel bandwidth $BW_{Channel}$ [MHz] | | | | | | | | |
|---|---|---|---|---|---|---|---|---|---|---|
| | | 5 | 10 | 15 | 20 | 25 | 40 | 50 | 60 | 80 | 100 |
| Maximum Transmission bandwidth $N_{RB}$ | 15 | 25 | 52 | 79 | 106 | 133 | 216 | 270 | N.A. | N.A. | N.A. |
| | 30 | 11 | 24 | 38 | 51 | 65 | 106 | 133 | 162 | 217 | 273 |
| | 60 | N.A. | 11 | 18 | 24 | 31 | 51 | 65 | 79 | 107 | 135 |

In the 5G or NR system, scheduling information on DL data or UL data is transferred through downlink control information (DCI) from the BS to the UE. The DCI may be defined in various formats, and depending on each format, the DCI may indicate whether it is scheduling information (UL grant) for UL data or scheduling information (DL grant) for DL data, whether it is compact DCI with small-sized control information, whether spatial multiplexing is applied using multiple antennas, whether it is DCI for power control, etc. For example, DCI format 1-1 that is scheduling control information for DL data (DL grant) may include one piece of the following control information:

carrier indicator: indicates which frequency carrier is used for transmission.

DCI format indicator: an indicator for distinguishing whether the DCI is for DL or UL.

bandwidth part (BWP) indicator: indicates which BWP is used for transmission.

frequency domain resource allocation: indicates an RB in the frequency domain allocated for data transmission.

A resource represented according to system bandwidth and a resource allocation scheme is determined.

time domain resource allocation: indicates which slot and which OFDM symbol in the slot are used to transmit a data-related channel.

VRB-to-PRB mapping: indicates which scheme is used to map a virtual RB (VRB) index and a physical RB (PRB) index.

modulation and coding scheme (MCS): indicates a modulation scheme and a coding rate used for data transmission. Specifically, it may indicate a coding rate value that may give information about a transport block size (TBS) and channel coding along with information about whether it is quadrature phase shift keying (QPSK), 16 quadrature amplitude modulation (16QAM), 64QAM, or 256QAM.

code block group (CBG) transmission information: indicates information about which CBG is transmitted when CBG retransmission is configured.

HARQ process number: indicates a process number of an HARQ.

new data indicator: indicates whether it is HARQ initial transmission or retransmission.

redundancy version: indicates a redundancy version of an HARQ.

transmit power control (TPC) command for physical uplink control channel (PUCCH): indicates a transmit power control command for UL control channel PUCCH.

For the aforementioned PUSCH transmission, time domain resource allocation may be delivered by information about a slot in which a PUSCH is transmitted, a start OFDM symbol position S in the slot, and the number L of OFDM symbols to which the PUSCH is mapped. The S may be a relative position from the beginning of the slot, the L may be the number of successive OFDM symbols, and the S and L may be determined from a start and length indicator value (SLIV) defined as follows:

If $(L-1) \leq 7$ then $SLIV = 14 \cdot (L-1) + S$ else $SLIV = 14 \cdot (14-L+1) + (14-1-S)$ where $0 < L \leq 14-S$ The 5G or NR system may be configured with a table including information about an SLIV value, a PUSCH mapping type, and a slot in which the PUSCH is transmitted in a row commonly through RRC configuration. Subsequently, time domain resource allocation in DCI indicates an index value in the configured table, so that the BS may deliver information about an SLIV value, a PUSCH mapping type, and a slot in which the PUSCH is transmitted to the UE.

In the 5G or NR system, type A and type B are defined for the PUSCH mapping type. For the PUSCH mapping type A, a first OFDM symbol of DMRS OFDM symbols is located in the second or third OFDM symbol in a slot. For the PUSCH mapping type B, a first OFDM symbol of DMRS OFDM symbols is located in the first OFDM symbol in a time domain resource allocated in PUSCH transmission.

DCI may be transmitted on a physical downlink control channel (PDCCH) (or control information, which is interchangeably used with the PDCCH) after going through channel coding and modulation processes.

In general, DCI is scrambled by a specific radio network temporary identifier (RNTI) separately for each UE, having cyclic redundancy check (CRC) added thereto, channel-coded, and then configured and transmitted in a separate PDCCH. The PDCCH is mapped and transmitted in a control resource set (CORESET) configured for the UE.

DL data may be transmitted on a physical downlink shared channel (PDSCH), which is a physical channel for DL data transmission. The PDSCH may be transmitted after a control channel transmission interval, and scheduling information such as a specific mapping position in the frequency domain, modulation scheme, etc., is determined based on the DCI transmitted through the PDCCH.

Through an MCS of the control information that makes up the DCI, the BS notifies the UE of a modulation scheme applied to the PDSCH for transmission and the size of data to be transmitted (transport block size; TBS). In an embodiment, an MCS may be comprised of 5 bits or more than or less than 5 bits. The TBS corresponds to the size of a transport block (TB) to be transmitted by the BS before channel coding for error correction is applied to the data.

In the disclosure, the transport block (TB) may include a medium access control (MAC) header, a MAC control element (CE), one or more MAC service data units (MAC SDU), and padding bits. Alternatively, the TB may represent a data unit or a MAC protocol data unit (MAC PDU) sent down to the physical layer from the MAC layer.

The 5G or NR system supports the following modulation schemes: QPSK (Quadrature Phase Shift Keying), 16QAM (Quadrature Amplitude Modulation), 64QAM, and 256QAM, and their respective modulation orders Qm are 2, 4, 6, and 8. For example, two bits per symbol may be transmitted for QPSK modulation, 4 bits per OFDM symbol for 16QAM modulation, 6 bits per symbol for 64QAM modulation, and 8 bits per symbol for 256QAM modulation.

Figure 2:
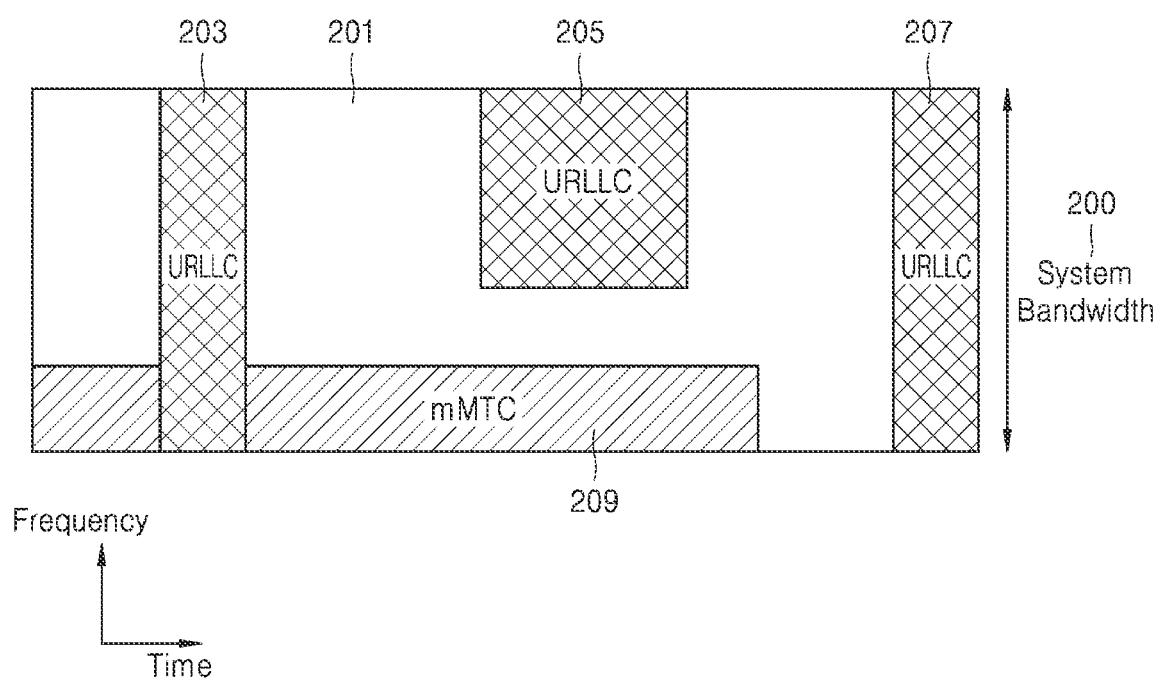
FIG. 2 is a diagram for describing how to allocate data for enhanced mobile broadband (eMBB), ultra-reliable and low-latency communications (URLLC), and massive machine type communications (mMTC) in a time-frequency resource region in a 5G or NR system.

FIG. 2 is a diagram for describing a method of allocating data for eMBB, URLLC, and mMTC in time-frequency resource region in a 5G or NR system.

Referring to FIG. 2, data for eMBB, URLLC, and mMTC may be allocated in a whole system frequency band 200. When URLLC data 203 205, and 207 occurs and needs to be transmitted while eMBB 201 and mMTC 209 are allocated and being transmitted in a particular frequency band, the URLLC data 203, 205, and 207 may be transmitted without emptying or transmitting a part already allocated the eMBB 201 and the mMTC 209. Of the aforementioned services, URLLC requires reduction in latency, so that the URLLC data may be allocated and transmitted in a portion of a resource allocated the eMBB or mMTC. When URLLC is further allocated and transmitted in a resource allocated eMBB, the eMBB data may not be transmitted in the overlapping time-frequency resource, and accordingly, transmission performance for the eMBB data may be reduced. In other words, eMBB data transmission failure may occur due to the URLLC allocation.

Figure 3:
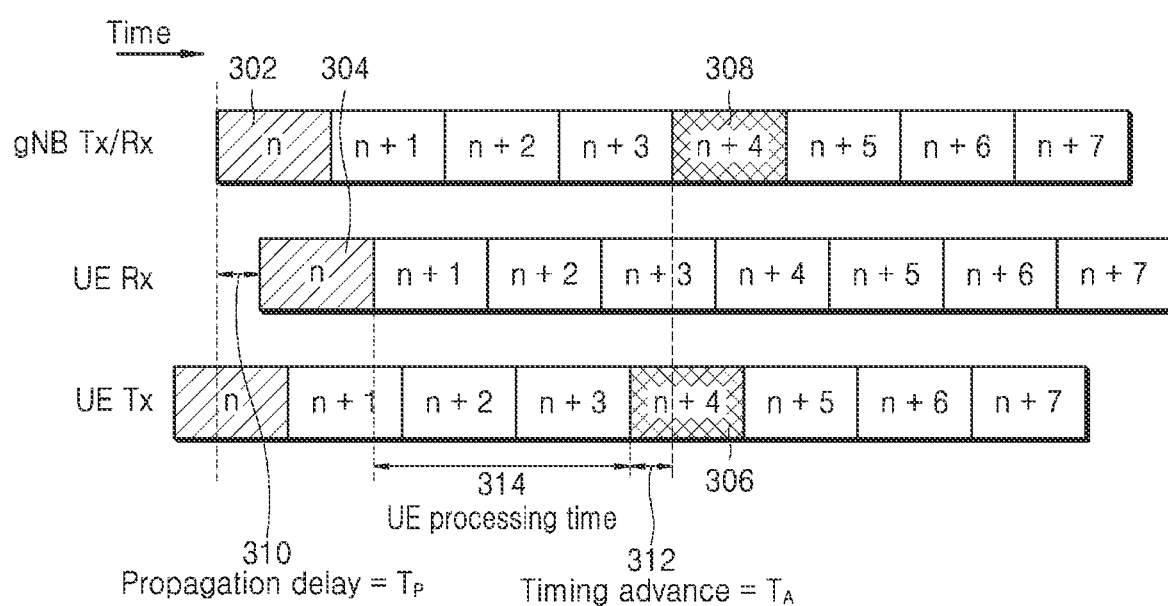
FIG. 3 is a diagram for describing processing time of a terminal based on timing advance, when the terminal receives a first signal and in response, transmits a second signal in a 5G or NR system.

FIG. 3 is a diagram for describing processing time of a UE based on timing advance, when the UE receives a first signal and in response, transmits a second signal in a 5G or NR system.

Referring to FIG. 3, when a UE receives a first signal in slot n 304, the UE transmits a second signal corresponding to the first signal in slot n+4 306. When a BS transmits the first signal in the slot n 302, the BS receives the second signal corresponding to the first signal in the slot n+4 308. Specifically, when the BS transmits UL scheduling grant, a DL control signal, or DL data to the UE in the slot n 302, the UE may receive the UL scheduling grant, the DL control signal, or DL data transmitted by the BS in the slot n 304. In this case, the reception at the UE may be delayed by $T_P$, which is propagation delay 310, from the transmission time at the BS. Even when the UE transmits a signal to the BS, the UE may transmit UL data or HARA ACK/NACK for DL data at a time advanced by timing advance $T_A$ 312 from the slot n+4 based on the signal received by the UE in order to make the signal arrive at the BS at a particular time. Accordingly, in an embodiment, UE processing time 314 for the UE to prepare to transmit UL data after receiving UL scheduling grant or deliver HARQ ACK or NACK after receiving DL data may be a period of time corresponding to three slots except for $T_A$.

To determine this preparation time, the BS may calculate an absolute value of $T_A$ of the corresponding UE. When initially accessed by the UE, the BS may calculate the absolute value of $T_A$ by adding to or subtracting from a $T_A$ value delivered to the UE for the first time in a random access process an amount of change in the $T_A$ value subsequently delivered by higher signaling. In an embodiment, the absolute value of $T_A$ may be a value 312 resulting from subtracting a start time of the n'th TTI received by the UE from a start time of the n'th TTI transmitted by the UE.

In the meantime, one of important factors for cellular wireless communication system capabilities is packet data latency. To this end, in the LTE system, a signal is transmitted or received in the unit of a subframe having a transmission time interval (TTI) of 1 ms. The LTE system may support a UE having a TTI shorter than 1 ms (short-TTI UE). On the other hand, in the 5G or NR system, a TTI may be shorter than 1 ms. The short-TTI UE is suitable for services such as a voice over LTE VoLTE) service for which latency is important or a remote control service. The short-TTI UE is also a means for substantializing cellular based mission-critical Internet of Things.

In the 5G or NR system, when the BS transmits a PDSCH including DL data, DCI that schedules the PDSCH indicates a $K_1$ value corresponding to timing information at which the UE transmits HARQ-ACK information for the PDSCH. Unless the HARQ-ACK information with timing advance included is indicated to be transmitted earlier than OFDM symbol $L_1$, the UE may transmit the HARQ-ACK information to the BS. In other words, with the timing advance included, the HARQ-ACK information may be transmitted from the UE to the BS at the same timing as or later than the OFDM symbol $L_1$. When the HARQ-ACK information with the timing advance included is indicated to be transmitted earlier than the OFDM symbol $L_1$, the HARQ-ACK information may not be valid HARQ-ACK information in the HARQ-ACK transmission from the UE to the BS. The OFDM symbol $L_1$ may be the first OFDM symbol in which cycle prefix (CP) starts after $T_{proc,1}$ from the last time of the last OFDM symbol of the PDSCH. $T_{proc,1}$ may be calculated as in equation 1 below:

$$T_{proc,1} = ((N_1 + d_{1,1} + d_{1,2})(2048 + 144) \cdot \kappa 2^{-\mu}) \cdot T_C \quad [\text{Equation 1}]$$

In the equation 1, $N_1$, $d_{1,1}$, $d_{1,2}$, $\kappa$, $\mu$, and $T_C$ may be defined as follows:

$N_1$ is based on the value of p presented in Table 3 and Table 4, and corresponds to $\mu$ among ($\mu_{PDCCH}, \mu_{PDSCH}, \mu_{UL}$) that generates the largest $T_{proc,1}$. That is, $\mu = \min(\mu_{PDCCH}, \mu_{PDSCH}, \mu_{UL})$. Of the aforementioned expressions, $\mu_{PDCCH}$ refers to subcarrier spacing (SCS) applied to PDCCH scheduling. $\mu_{PDSCH}$ refers to SCS applied to a scheduled PDSCH. $\mu_{UL}$ refers to SCS of a UL channel on which HARQ-ACK is transmitted.

$d_{1,1}=0$ when HARQ-ACK information is transmitted on a PUCCH (UL control channel), and $d_{1,1}=1$ when HARQ-ACK information is transmitted on a PUSCH (UL shared channel, data channel).

when the UE is configured with a plurality of active configuration carriers or carriers, a maximum timing difference between carriers may be reflected in transmission of the second signal.

for the PDSCH mapping type A, i.e., in a case that the first DMRS OFDM symbol is positioned in the third or fourth OFDM symbol of a slot, when the position index i of the last OFDM symbol is smaller than 7, $d_{1,2}=7-i$. Otherwise, $d_{1,2}=0$.

for the PDSCH mapping type B for UE processing capability 1, i.e., in a case that the first DMRS OFDM symbol is positioned in the first OFDM symbol of the PDSCH, $d_{1,2}=3$ when the PDSCH has the length of 4 OFDM symbols, or $d_{1,2}=3+d$ when the PDSCH has the length of 2 OFDM symbols, where d is the number of overlapping OFDM symbols between the PDSCH and a PDCCH including a control signal for scheduling the PDSCH. Otherwise, $d_{1,2}=0$.

for the PDSCH mapping type B for UE processing capability 2, i.e., in a case that the first DMRS OFDM symbol is positioned in the first OFDM symbol of the PDSCH, $d_{1,2}$ is the number of overlapping OFDM symbols between the PDSCH and a PDCCH including a control signal for scheduling the PDSCH when the length of the PDSCH is 2 or 4. Otherwise, $d_{1,2}=0$.

$N_1$ is defined according to p as in the following Table 3 or Table 4. $\mu=0$, 1, 2, and 3 refer to SCS 15 kHz, 30 kHz, 60 kHz, 120 kHz, respectively. Table 3 represents PDSCH processing time for PDSCH processing capability 1, and Table 4 represents PDSCH processing time for PDSCH processing capability 2.

TABLE 3

| | PDSCH decoding time $N_1$ [symbols] | |
|---|---|---|
| $\mu$ | No additional PDSCH DM-RS configured | Additional PDSCH DM-RS configured |
| 0 | 8 | 13 |
| 1 | 10 | 13 |
| 2 | 17 | 20 |
| 3 | 20 | 24 |

TABLE 4

| | PDSCH decoding time $N_1$ [symbols] | |
|---|---|---|
| $\mu$ | No additional PDSCH DM-RS configured | Additional PDSCH DM-RS configured |
| 0 | 3 | 13 |
| 1 | 4.5 | 13 |
| 2 | 9 for FR 1 | 20 | the aforementioned value of $N_1$ may be used with Table 3 or Table 4 according to UE capability.

$T_c = 1/(\Delta f f_{max}())$, $\Delta f 3_{max}$ Hz, $N_f = 4096$, $\kappa = T_s / T_c = 64$, $T_s = 1/(\Delta f_{ref} \cdot N_{f,ref})$, $\Delta f_{ref} = 15 \cdot 10^3$ Hz, and $N_{1,ref} = 2048$.

Furthermore, in the 5G or NR system, when the BS transmits control information including UL scheduling grant, the UE may indicate a value of $K_2$ corresponding to information of timing at which the UE transmits UL data or a PUSCH.

Unless the PUSCH with timing advance included is indicated to be transmitted earlier than OFDM symbol $L_2$, the UE may transmit the PUSCH to the BS. In other words, with the timing advance included, the PUSCH may be transmitted from the UE to the BS at the same timing as or later than the OFDM symbol $L_2$. When the PUSCH with timing advance included is indicated to be transmitted earlier than OFDM symbol $L_2$, the UE may discard the UL scheduling grant control information from the BS. The OFDM symbol $L_2$ may be the first OFDM symbol in which cycle prefix (CP) of a PUSCH OFDM symbol to be transmitted starts after $T_{proc,2}$ from the last time of the last OFDM symbol of the PDCCH including the scheduling grant. $T_{proc,2}$ may be calculated as in equation 2 below:

$$T_{proc,2} = \max\{((N_2 + d_{2,1} + d_{2,2})(2048 + 144) \cdot \kappa 2^{-\mu}) \cdot T_c, d_{2,3}\} \quad \text{[Equation 2]}$$

In the equation 2, $N_2$, $d_{2,1}$, $d_{2,2}$, $d_{2,3}$, $\kappa$, $\mu$, and $T_C$ may be defined as follows:

- $N_2$ is based on the value of p presented in Table 5 and Table 6, and corresponds to $\mu$ among ($\mu_{DL}, \mu_{UL}$) that generates the largest $T_{proc,1}$. That is, $\mu = \min(\mu_{DL}, \mu_{UL})$. Of the aforementioned expressions, $\mu_{UL}$ refers to SCS with which a PDSCH including DCI that schedules a PUSCH is transmitted. $\mu_{UL}$ refers to SCS of a UL channel on which the PUSCH is transmitted.
- when the first of OFDM symbols allocated the PUSCH includes only DMRS, $d_{2,1}=0$, and otherwise, $d_{2,1}=1$.
- when HARQ-ACK is multiplexed in the PUSCH scheduled as described above, $d_{2,2}=1$, and otherwise, $d_{2,2}=0$.
- when the UE is configured with a plurality of active configuration carriers or carriers, a maximum timing difference between carriers may be reflected in transmission of the second signal.
- when DCI indicating bandwidth part (BWP) switching is scheduled, $d_{2,3}$ refers to a time required for BWP switching. Otherwise, $d_{2,3}=0$.
- $N_2$ is defined according to $\mu$ as in the following Table 5 or Table 6. $\mu=0, 1, 2,$ and 3 refer to SCS 15 kHz, 30 kHz, 60 kHz, 120 kHz, respectively. Table 5 represents PUSCH preparation time for UE processing capability 1, and Table 6 represents PUSCH preparation time for UE processing capability 2.'

TABLE 5

| μ | PUSCH preparation time $N_2$ [symbols] |
|---|---|
| 0 | 10 |
| 1 | 12 |
| 2 | 23 |
| 3 | 36 |

TABLE 6

| μ | PUSCH preparation time $N_2$ [symbols] |
|---|---|
| 0 | 3 |
| 1 | 4.5 |
| 2 | 9 for FR1 | the aforementioned value of $N_2$ may be used with Table 5 or Table 6 according to UE capability.

Figure 4:
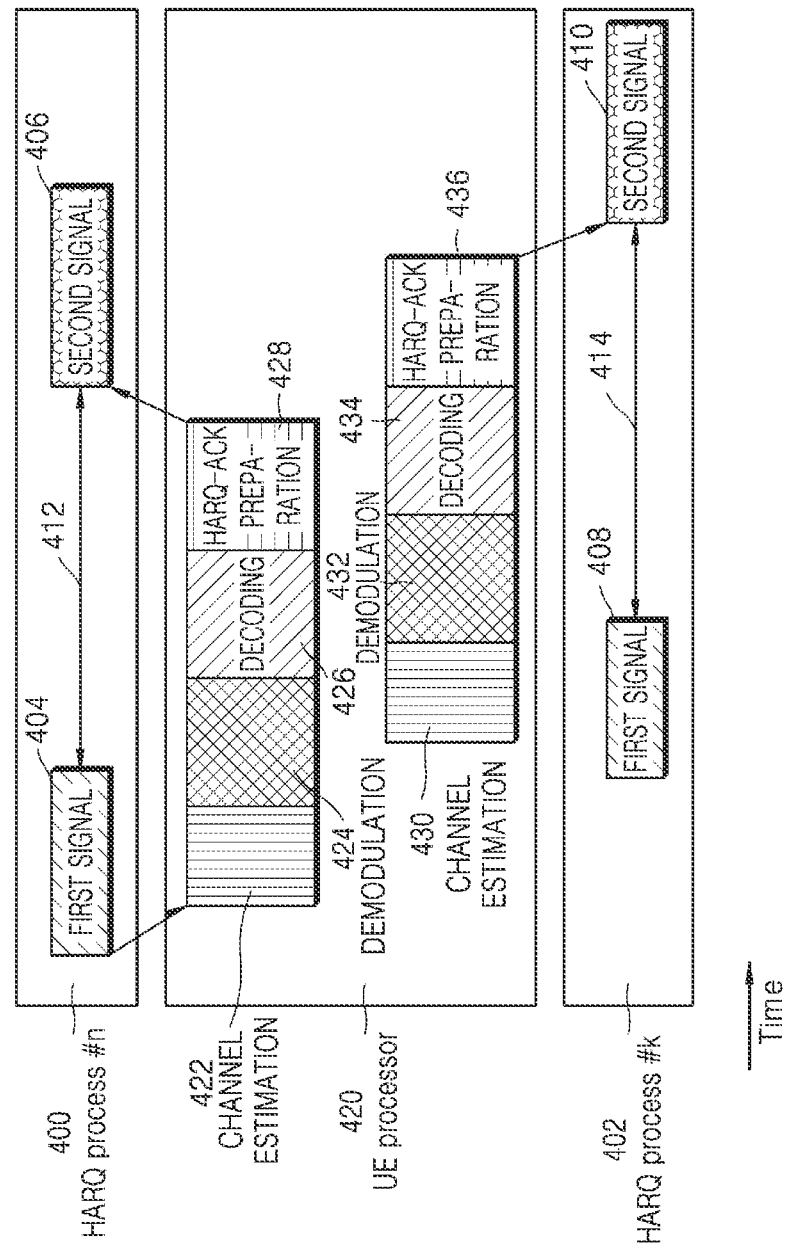
FIG. 4 is a diagram for describing processing of a terminal based on occurrence of multiple hybrid automatic repeat request (HARQ) processes, when the terminal receives a first signal and in response, transmits a second signal in a 5G or NR system, according to an embodiment of the disclosure.

$T_c = 1/(\Delta f_{max}()), \Delta f 3_{max}$ Hz, $N_f = 4096, \kappa = T_s/T_c = 64,$ $T_s = 1/(\Delta f_{ref} \cdot N_{f,ref}), \Delta f_{ref} = 15 \cdot 10^3$ Hz, and $N_{f,ref} = 2048.$ FIG. 4 is a diagram for describing processing of a UE based on occurrence of multiple HARQ processes, when the UE receives a first signal and in response, transmits a second signal in a 5G or NR system, according to an embodiment of the disclosure.

Referring to FIG. 4, in an n'th HARQ process 400, a first signal 404 is transmitted and received by a BS and a UE, respectively, and a corresponding second signal 406 is transmitted and received by the UE and the BS, respectively. Specifically, when a time gap 412 between the first signal 404 and the second signal 406 is equal to or greater than $T_{proc,1}$ (or $T_{proc,2}$), the second signal is transmitted. Otherwise, the UE may ignore transmission of the second signal or perform transmission of an invalid second signal.

In a k'th HARQ process 402, a first signal 408 is transmitted and received by the BS and the UE, respectively, and a corresponding second signal 410 is transmitted and received by the UE and the BS, respectively. Specifically, when a time gap 414 between the first signal 408 and the second signal 410 is equal to or greater than $T_{proc,1}$ (or $T_{proc,2}$), the second signal is transmitted. Otherwise, the UE may ignore transmission of the second signal or perform transmission of the invalid second signal.

Specifically, UE processing for transmitting or receiving the first signal and the second signal of the n'th and k'th HARQ processes in a UE processor 420 is required. For example, the UE processor required when the first signal is DL data information and the second signal is HARQ-ACK information may be configured with channel estimation, demodulation, decoding, and HARQ-ACK preparation blocks. Furthermore, it may be common for the UE to use each of the blocks for once regardless of the number of HARQ processes. In this situation, the UE performs channel estimation 422, demodulation 424, decoding 426, and HARQ-ACK preparation 428 processes to process the first signal 404 and the corresponding second signal 406 in the n'th HARQ process. The UE performs channel estimation 430, demodulation 432, decoding 434, and HARQ-ACK preparation 436 processes to process the first signal 408 and the corresponding second signal 410 of the k'th HARQ process.

In the 5G or NR system, the UE basically processes the first signal and the corresponding second signal in multiple HARQ processes through pipeline operation. In other words, the respective blocks that form the UE processor may operate in parallel for each HARQ process, as shown in FIG. 4. In this case, however, channel estimation (or demodulation, decoding, or HARQ ACK preparation) for processing the first signal 408 of the k'th HARQ process may not be possible until channel estimation (or demodulation, decoding, or HARQ ACK preparation) for processing the first signal 404 of the n'th HARQ process is completed. The UE may support multiple HARQ processes while using fewer resources (e.g., the number or capabilities of blocks constituting the processor) through the pipeline operation.

Figure 5:
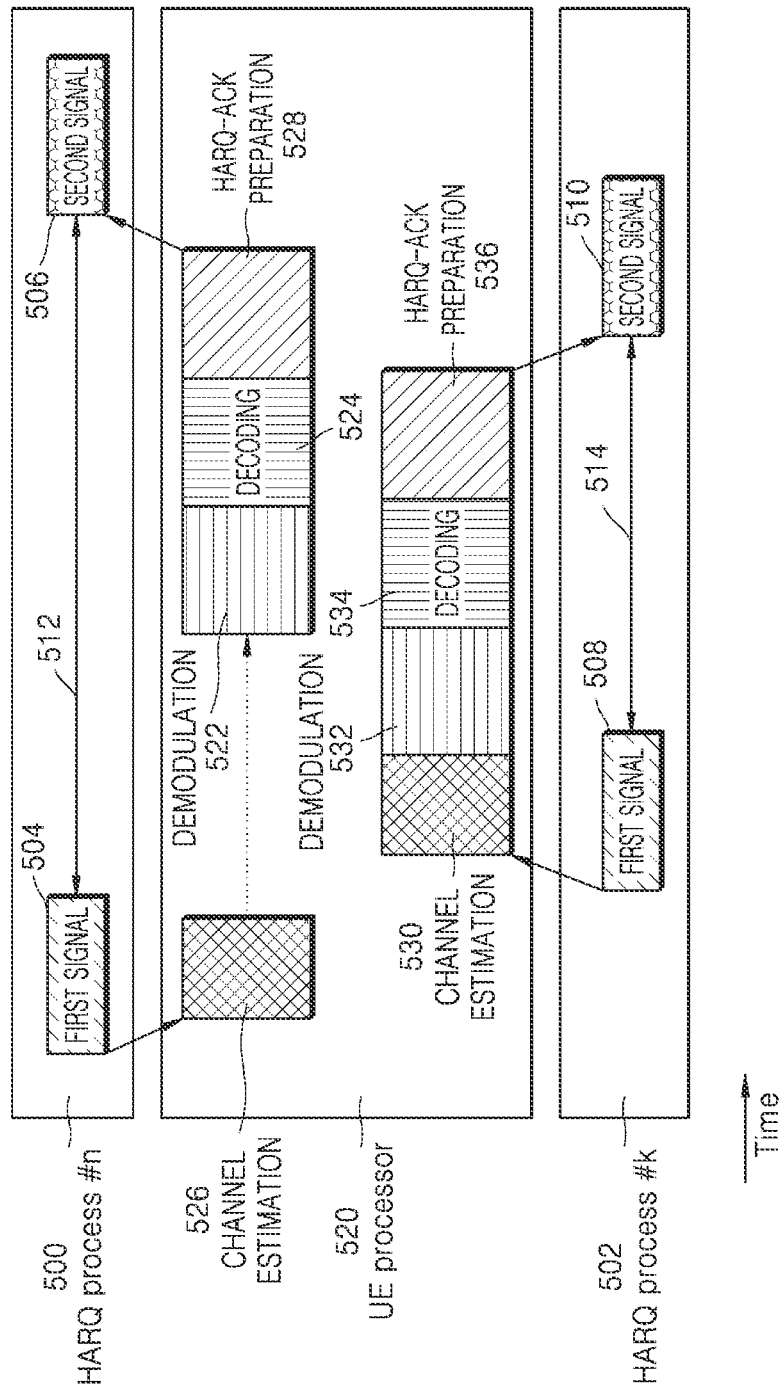
FIG. 5 is a diagram for describing a processing time of a terminal based on an occurrence of out-of-order HARQ, when the terminal receives a first signal and in response, transmits a second signal in a 5G or NR system, according to an embodiment of the disclosure.

FIG. 5 is a diagram for describing processing time of a UE based on an occurrence of out-of-order HARQ, when the UE receives a first signal and in response, transmits a second signal in a 5G or NR system, according to an embodiment of the disclosure.

Referring to FIG. 5, a first signal 504 is transmitted and received by a BS and a UE, respectively, in an n'th HARQ process 500, and a corresponding second signal 506 is transmitted and received by the UE and the BS, respectively. Specifically, when a time gap 512 between the first signal 504 and the second signal 506 is equal to or greater than $T_{proc,1}$ (or $T_{proc,2}$), the second signal is transmitted. Otherwise, the UE may ignore transmission of the second signal or perform transmission of the invalid second signal.

In a k'th HARQ process 502, a first signal 508 is transmitted and received by the BS and the UE, respectively, and a corresponding second signal 510 is transmitted and received by the UE and the BS, respectively. Specifically, when a time gap 514 between the first signal 508 and the second signal 510 is equal to or greater than $T_{proc,1}$ (or $T_{proc,2}$), the second signal is transmitted. Otherwise, the UE may ignore transmission of the second signal or perform transmission of the invalid second signal.

In the UE, it is possible for the operation of processing the first signal 504 and the second signal 506 of the n'th HARQ process 500 to be affected by processing of the first signal 508 and the second signal 510 of the k'th HARQ process 502. For example, referring to FIG. 5, when the first signal is DL data information and the second signal is HARQ-ACK information for the DL data, the UE performs a series of pipeline operations such as estimating a DL data channel, performing demodulation and decoding based on the estimated channel value, preparing control information for HARQ-ACK transmission, etc., to report HARQ-ACK for results of DL data reception and decoding of the data to the BS. During the processing of the first signal 504 and the second signal 506 in the n'th HARQ process 500, the first signal 508 of the k'th HARQ process 502 is received by the UE later in time than the first signal 504 of the n'th HARQ process 500, but the second signal 510 of the k'th HARQ process 502 needs to be transmitted by the UE earlier in time than the second signal 506 of the n'th HARQ process 500.

When the channel estimation, demodulation, decoding, and HARQ ACK preparation processes are handled in order of receiving the first signals in numerical order of HARQ processes as shown in FIG. 4, it is possible for the processing of the first signal and the corresponding second signal of the k'th HARQ process to be delayed due to the n'th HARQ process, and accordingly, processing of the first signal and the corresponding second signal of the k'th HARQ process may not be finished before the time to transmit the second signal of the k'th HARQ process. Hence, unlike the method as described in connection with FIG. 4, for particular UE processor blocks (e.g., channel estimation, demodulation, decoding, or HARQ-ACK preparation), the UE needs to give priority to processing of the first signal and the corresponding second signal of the k'th HARQ process, which have been received later in time. In other words, unlike the pipeline operation as described above in connection with FIG. 4, a situation may occur where the UE needs to take priority on processing of the first signal and second signal of the k'th HARQ process over processing of the first signal and second signal of the n'th HARQ process. Referring to FIG. 5, a situation may occur where the UE performs channel estimation for the first signal 504 of the n'th HARQ process 500 earlier than channel estimation for the first signal 508 of the k'th HARQ process 502, but after this, needs to handle demodulation, decoding, and HARQ ACK later.

This situation is more likely to occur when eMBB data requiring high rate transmission is processed in the n'th HARQ process 500 and URLLC data requiring high reliability and low latency is processed in the k'th HARQ process 502. As the UE needs to give priority to URLLC data, HARQ-ACK for the URLLC data is likely to be reported earlier than reporting of HARQ-ACK for the eMBB data even when the eMBB data has been transmitted or received earlier than the URLLC data.

In the disclosure, such a situation is called an 'out-of-order HARQ'. When the following two conditions are all met, the k'th HARQ process may be the out-of-order HARQ from the perspective of the n'th HARQ process.

1. (From the perspective of an OFDM symbol or a slot) a start OFDM symbol of the first signal of the k'th HARQ process is transmitted or received later than a start OFDM symbol of the first signal of the n'th HARQ process
2. (From the perspective of an OFDM symbol or a slot) a start OFDM symbol of the second signal of the k'th HARQ process is transmitted or received earlier than a start OFDM symbol of the second signal of the n'th HARQ process In an embodiment, whether an OFDM symbol is transmitted or received earlier or later may be determined by comparing times at which OFDM symbols start to be received, times at which the reception is completed, etc. For example, which OFDM symbol is received later may be determined by comparing a time at which the start OFDM symbol of the first signal of the n'th HARQ process is started with a time at which the start OFDM symbol of the first signal of the k'th HARQ process is started. Also, which OFDM symbol is received later may also be determined by comparing a time at which the start OFDM symbol of the first signal of the n'th HARQ process is ended with a time at which the start OFDM symbol of the first signal of the k'th HARQ process is ended. Furthermore, which OFDM symbol is received later may be determined by comparing a time at which the start OFDM symbol of the first signal of the n'th HARQ process is started with a time at which the start OFDM symbol of the first signal of the n'th HARQ process is ended or comparing a time at which the start OFDM symbol of the first signal of the n'th HARQ process is ended with a time at which the start OFDM symbol of the first signal of the n'th HARQ process is started. In this case, both the time at which the OFDM symbol starts to be received and the time at which the reception is completed may be considered, or determination may be made by considering both the time at which reception starts and the time at which the reception is completed in one HARQ process and considering one of the time at which reception starts and the time at which the reception is completed in the other HARQ process.

Referring to FIG. 5, the k'th HARQ process 502 may be the out-of-order HARQ from the perspective of the n'th HARQ process 500. A processing time required for processing the first signal 504 and the corresponding second signal 506 of the n'th HARQ process 500 with the presence of the out-of-order HARQ is likely to differ from a processing time required for processing the first signal 504 and the corresponding second signal 506 of the n'th HARQ process 500 without the presence of the out-of-order HARQ, in which case, the former processing time may be generally equal to or greater than the latter processing time.

Accordingly, the BS and the UE need to consider $T_{proc,1}$ (or $T_{proc,2}$) by reflecting the out-of-order HARQ. This will now be described in more detail in connection with FIGS. 6 to 8.

Figure 6:
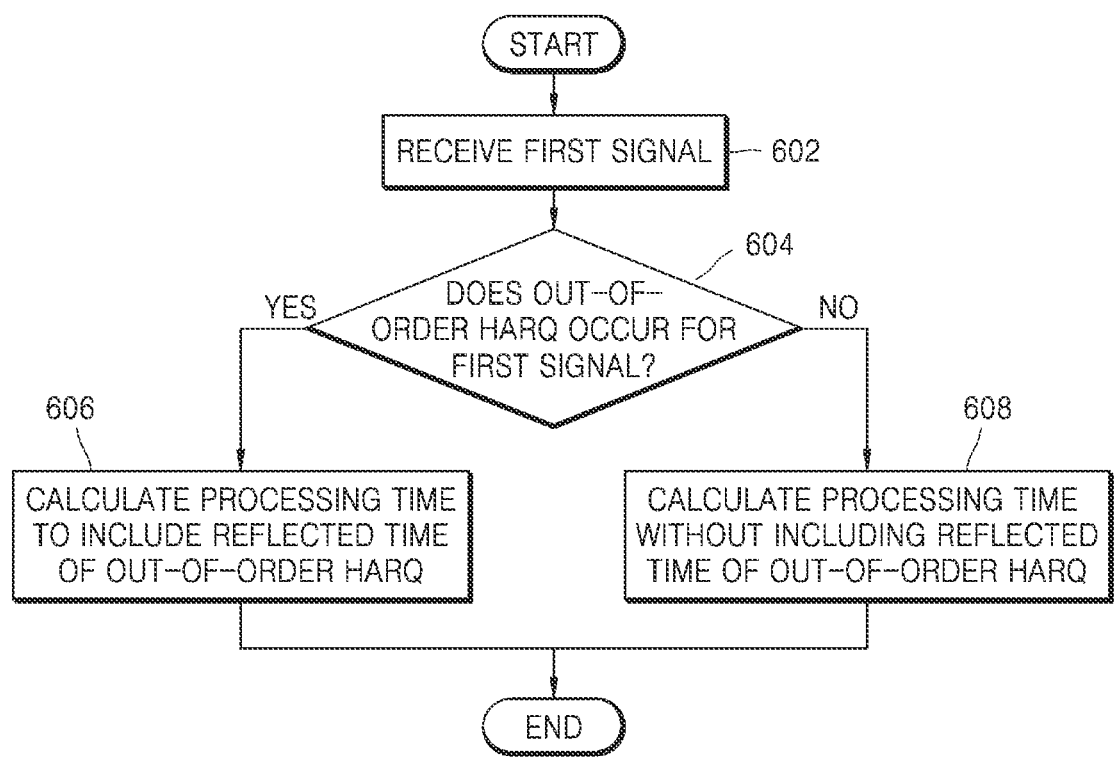
FIG. 6 is a flowchart illustrating operation of a terminal based on an occurrence of out-of-order HARQ, when the terminal receives a first signal and in response, transmits a second signal in a 5G or NR system, according to an embodiment of the disclosure.

FIG. 6 is a flowchart illustrating operation of a UE based on an occurrence of out-of-order HARQ, when the UE receives a first signal and in response, transmits a second signal in a 5G or NR system, according to an embodiment of the disclosure.

In the disclosure, a process in which a BS and a UE use an out-of-order HARQ to determine a processing time is included. After the BS and the UE respectively transmit and receive the first signal in operation 602, whether an out-of-order HARQ process from the perspective of an HARQ process including the first signal occurs is identified in operation 604. When no out-of-order HARQ process occurs, a minimum processing time without including compensation time for the out-of-order HARQ process is calculated, in operation 608. On the other hand, when the out-of-order HARQ process occurs, calculation is performed by including compensation time for the out-of-order HARQ process, in operation 606. In the disclosure, the minimum processing time may refer to the earliest time at which to transmit the second signal. This may be a process of calculating $L_1$ or $L_2$, or a process of calculating $T_{proc,1}$ or $T_{proc,2}$, or a process of calculating a time to actually transmit the second signal. In an embodiment, calculation including the compensation time may refer to calculation by taking into account the added number of HARQ processes, increased time due to the out-of-order HARQ process and adding an already determined OFDM symbol or the increased time.

[Calculate $T_{proc,1}$ in an Embodiment of PDSCH to HARQ-ACK]

In an embodiment, when the first signal is DL data and the second signal is HARQ-ACK, the UE may calculate the processing time $T_{proc,1}$ using the following equation 3 or equation 4 instead of the equation 1.

$$T_{proc,1} = ((N_1 + d_{1,1} + d_{1,2} + d_{1,3})(2048 + 144) \cdot \kappa 2^{-\mu}) \cdot T_C \quad \text{[Equation 3]}$$

$$T_{proc,1} = ((N_1 + d_{1,1} + d_{1,2})(2048 + 144) \cdot \kappa 2^{-\mu}) \cdot T_C + d_{1,3} \quad \text{[Equation 4]}$$

In the equation 3 or 4, variables $N_1$, $d_{1,1}$, $d_{1,2}$, $\kappa$, $\mu$, and $T_C$ have the same meaning as in the equation 1. $d_{1,3}$ refers to a compensation time for the occurrence of out-of-order HARQ. In the equation 3, $d_{1,3}$ is an OFDM symbol unit for the SCS p, and in the equation 4, $d_{1,3}$ is an absolute time value in the equation 4. $d_{1,3}$ may be configured with one, two or more combinations of the followings:

- the number of out-of-order HARQ processes that have occurred
- a minimum processing time $T_{proc,1}$ of an out-of-order HARQ that has occurred
- the largest value of minimum processing times $T_{proc,1}$ of out-of-order HARQs that have occurred
- the least value of minimum processing times $T_{proc,1}$ of out-of-order HARQs that have occurred
- an average value of minimum processing times $T_{proc,1}$ of out-of-order HARQs that have occurred
- the least value of SCSs $\mu$ of the out-of-order HARQ that has occurred In an embodiment, $d_{1,3}$ may have a value defined to be greater than 0 when the out-of-order HARQ occurs, and $d_{1,3}$ may be 0 without an occurrence of out-of-order HARQ. Also, $d_{1,3}$ may have the largest value, or use a value predefined in a standard, or may be preset in higher signaling. In another embodiment, $d_{1,3}$ may be defined as in the following Table 7. Table 7 represents values of $d_{1,3}$ according to the number of out-of-order HARQ processes in an embodiment.

TABLE 7

| | Out-of-order HARQ Process Count | | | | |
|---|---|---|---|---|---|
| | 1 | 2 | 3 | ... | ... |
| $d_{1,3}$[OFDM symbol unit or time unit] | a | b | c | ... | ... | where a, b, c, ... may be preset values. Furthermore, although a, b, c, ... are different letters used for convenience, they may have the same value.

The UE may perform adaptive HARQ-ACK information transmission using the value of $T_{proc,1}$ calculated through the equation 3 or equation 4. Unless the HARQ-ACK information with timing advance included is indicated to be transmitted earlier than OFDM symbol $L_1$, the UE may transmit the HARQ-ACK information to the BS. In other words, with the timing advance included, the HARQ-ACK information may be transmitted from the UE to the BS at the same timing as or later than the OFDM symbol $L_1$. When the HARQ-ACK information with the timing advance included is indicated to be transmitted earlier than the OFDM symbol $L_1$, the HARQ-ACK information may not be valid HARQ-ACK information in the HARQ-ACK transmission from the UE to the BS. Alternatively, when the HARQ-ACK information with the timing advance included is indicated to be transmitted earlier than the OFDM symbol $L_1$, the UE may not perform HARQ-ACK transmission to the BS or may transmit NACK information. The OFDM symbol $L_1$ may be the first OFDM symbol in which cycle prefix (CP) starts after $T_{proc,1}$ from the last time of the last OFDM symbol of the PDSCH.

In an embodiment, a calculation formula of the processing time $T_{proc,1}$ may be selected by the following [pseudo code 1] or [pseudo code 2] according to whether the out-of-order HARQ occurs.

[pseudo code 1 starts]
If UE is scheduled with out-of-order HARQ process, $$T_{proc,1} = ((N_1 + d_{1,1} + d_{1,2} + d_{1,3})(2048 + 144) \cdot \kappa 2^{-\mu}) \cdot T_C$$

Otherwise, $$T_{proc,1} = ((N_1 + d_{1,1} + d_{1,2})(2048 + 144) \cdot \kappa 2^{-\mu}) \cdot T_C$$

[End pseudo code 1]
[Start pseudo code 2]
If UE is scheduled with out-of-order HARQ process, $$T_{proc,1} = ((N_1 + d_{1,1} + d_{1,2})(2048 + 144) \cdot \kappa 2^{-\mu}) \cdot T_C + d_{1,3}$$

Otherwise, $$T_{proc,1} = ((N_1 + d_{1,1} + d_{1,2})(2048 + 144) \cdot \kappa 2^{-\mu}) \cdot T_C$$

[End pseudo code 2]

In an embodiment, whether to accept the occurrence of out-of-order HARQ may be configured by higher signaling, and a calculation formula of the processing time $T_{proc,1}$ may be selected by the following [pseudo code 3] or [pseudo code 4].

[Start pseudo code 3]
If UE is configured to schedule out-of-order HARQ process, $$T_{proc,1} = ((N_1 + d_{1,1} + d_{1,2} + d_{1,3})(2048 + 144) \cdot \kappa 2^{-\mu}) \cdot T_C$$

Otherwise, $$T_{proc,1} = ((N_1 + d_{1,1} + d_{1,2})(2048 + 144) \cdot \kappa 2^{-\mu}) \cdot T_C$$

[End pseudo code 3]
[Start pseudo code 4]
If UE is configured to schedule out-of-order HARQ process, $$T_{proc,1} = ((N_1 + d_{1,1} + d_{1,2})(2048 + 144) \cdot \kappa 2^{-\mu}) \cdot T_C + d_{1,3}$$

Otherwise, $$T_{proc,1} = ((N_1 + d_{1,1} + d_{1,2})(2048 + 144) \cdot \kappa 2^{-\mu}) \cdot T_C$$

[End pseudo code 4]
[$T_{proc,2}$ in an Embodiment of PDCCH to PUSCH]

In an embodiment, when the first signal is PUSCH grant (or DL control information) and the second signal is PUSCH (or UL data), the UE may calculate the processing time $T_{proc,2}$ using the following equation 5 or equation 6 instead of the equation 2.

$$T_{proc,2} = \max\{((N_2 + d_{2,1} + d_{2,2} + d_{2,4})(2048 + 144) \cdot \kappa 2^{-\mu}) \cdot T_C, d_{2,3}\} \quad \text{[Equation 5]}$$

$$T_{proc,2} = \max\{((N_2 + d_{2,1} + d_{2,2})(2048 + 144) \cdot \kappa 2^{-\mu}) \cdot T_C + d_{2,4}, d_{2,3}\} \quad \text{[Equation 6]}$$

In the equation 5 or 6, variables $N_2$, $d_{2,1}$, $d_{2,2}$, $d_{2,3}$, $\kappa$, $\mu$, and $T_C$ have the same meaning as in the equation 2. $d_{2,4}$ refers to a compensation time for the occurrence of out-of-order HARQ. In the equation 5, $d_{2,4}$ is an OFDM symbol unit for the SCS p, and in the equation 6, $d_{2,4}$ is an absolute time value in the equation 6. $d_{2,4}$ may be configured with one, two or more combinations of the followings:
- the number of out-of-order HARQ processes that have occurred
- a minimum processing time $T_{proc,2}$ of an out-of-order HARQ that has occurred
- the largest value of minimum processing times $T_{proc,2}$ of out-of-order HARQs that have occurred
- the least value of minimum processing times $T_{proc,2}$ of out-of-order HARQs that have occurred
- an average value of minimum processing times $T_{proc,2}$ of out-of-order HARQs that have occurred
- the least value of SCSs p of the out-of-order HARQ that has occurred In an embodiment, $d_{2,4}$ may have a value defined to be greater than 0 when the out-of-order HARQ occurs, and $d_{2,4}$ may be 0 without an occurrence of out-of-order HARQ. Also, $d_{2,4}$ may have the largest value, or use a value predefined in a standard, or may be preset in higher signaling. In another embodiment, $d_{2,4}$ may be defined as in the following Table 8. Table 8 represents values of $d_{2,4}$ according to the number of out-of-order HARQ processes in an embodiment.

TABLE 8

| | Out-of-order HARQ process count | | | | |
|---|---|---|---|---|---|
| | 1 | 2 | 3 | ... | ... |
| d2,4[OFDM symbol unit or time unit] | a | b | c | ... | ... | where a, b, c, . . . may be preset values. Furthermore, although a, b, c, . . . are different letters used for convenience, they may have the same value.

The UE may perform adaptive PUSCH transmission using the value of $T_{proc,2}$ calculated through the equation 5 or equation 6. Specifically, unless the PUSCH with timing advance included is indicated to be transmitted earlier than OFDM symbol $L_2$, the UE may transmit the PUSCH to the BS. In other words, with the timing advance included, the PUSCH may be transmitted from the UE to the BS at the same timing as or later than the OFDM symbol $L_2$. When the PUSCH with timing advance included is indicated to be transmitted earlier than OFDM symbol $L_2$, the UE may ignore the UL scheduling grant control information from the BS. The OFDM symbol $L_2$ may be the first OFDM symbol in which cycle prefix (CP) of a PUSCH OFDM symbol to be transmitted starts after $T_{proc,2}$ from the last time of the last OFDM symbol of the PDCCH including the scheduling grant.

In an embodiment, a calculation formula of the processing time $T_{proc,2}$ may be selected by the following [pseudo code 5] or [pseudo code 6] according to whether an out-of-order HARQ occurs.

[Start pseudo code 5]
If UE is scheduled with out-of-order HARQ process, $$T_{proc,2} = \max\{((N_2 + d_{2,1} + d_{2,2} + d_{2,4})(2048 + 144) \cdot \kappa 2^{-\mu}) \cdot T_C, d_{2,3}\}$$

Otherwise, $$T_{proc,2} = \max\{((N_2 + d_{2,1} + d_{2,2})(2048 + 144) \cdot \kappa 2^{-\mu}) \cdot T_C, d_{2,3}\}$$

[End pseudo code 5]
[Start pseudo code 6]
If UE is scheduled with out-of-order HARQ process, $$T_{proc,2} = \max\{((N_2 + d_{2,1} + d_{2,2})(2048 + 144) \cdot \kappa 2^{-\mu}) \cdot T_C + d_{2,4}, d_{2,3}\}$$

Otherwise, $$T_{proc,2} = \max\{((N_2 + d_{2,1} + d_{2,2})(2048 + 144) \cdot \kappa 2^{-\mu}) \cdot T_C, d_{2,3}\}$$

[End pseudo code 6]

In an embodiment, whether to accept the occurrence of out-of-order HARQ may be configured by higher signaling, and a calculation formula of the processing time $T_{proc,2}$ may be selected by the following [pseudo code 7] or [pseudo code 8].

[Start pseudo code 7]
If UE is configured to schedule out-of-order HARQ process, $$T_{proc,2} = \max\{((N_2 + d_{2,1} + d_{2,2} + d_{2,4})(2048 + 144) \cdot \kappa 2^{-\mu}) \cdot T_C, d_{2,3}\}$$

Otherwise, $$T_{proc,2} = \max\{((N_2 + d_{2,1} + d_{2,2})(2048 + 144) \cdot \kappa 2^{-\mu}) \cdot T_C, d_{2,3}\}$$

[End pseudo code 7]
[Start pseudo code 8]
If UE is configured to schedule out-of-order HARQ process, $$T_{proc,2} = \max\{((N_2 + d_{2,1} + d_{2,2})(2048 + 144) \cdot \kappa 2^{-\mu}) \cdot T_C + d_{2,4}, d_{2,3}\}$$

Otherwise, $$T_{proc,2} = \max\{((N_2 + d_{2,1} + d_{2,2})(2048 + 144) \cdot \kappa 2^{-\mu}) \cdot T_C, d_{2,3}\}$$

[End pseudo code 8]

Figure 7:
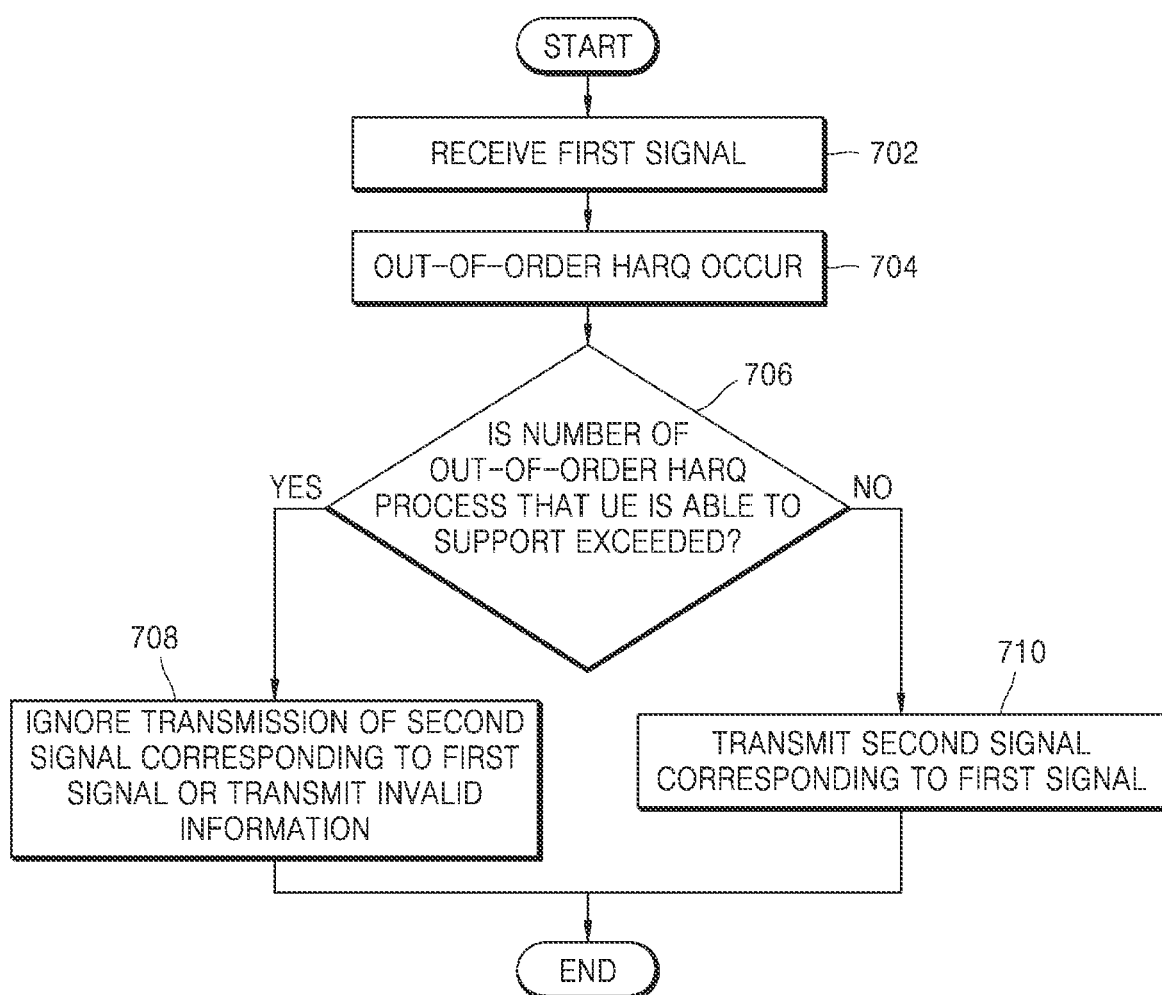
FIG. 7 is a flowchart illustrating operation of a terminal based on the number of out-of-order HARQ processes that the terminal is able to support, when the terminal receives a first signal and in response, transmits a second signal in a 5G or NR system, according to an embodiment of the disclosure.

FIG. 7 is a flowchart illustrating operation of a UE based on the number of out-of-order HARQ processes that the UE is able to support, when the UE receives a first signal and in response, transmits a second signal in a 5G or NR system, according to an embodiment of the disclosure.

A UE receives a first signal, in operation 702. On an occasion when an out-of-order HARQ occurs in operation 704 before transmission of a second signal corresponding to the first signal, the UE determines whether out-of-order HARQs occur beyond the number of out-of-order HARQ processes that the UE is able to support, in operation 804. In this case, the definition as described above in connection with FIG. 5 is applied to a condition for determining an occurrence of out-of-order HARQ. In an embodiment, the number of out-of-order HARQ processes that the UE is able to support may be reported in UE capability to the BS in advance, or may be configured separately from the BS through higher signaling within the number of out-of-order HARQ processes that the UE is able to support.

When out-of-order HARQs occur beyond the number of out-of-order HARQ processes that the UE is able to support, the UE may ignore transmission of the second signal corresponding to the first signal or transmit invalid information, in operation 708. In general HARQ-ACK transmission, the UE transmits ACK or NACK, but the invalid information may refer to the ACK or NACK being invalid. In an embodiment, the UE may ignore transmission of the second signal corresponding to the first signal or transmit invalid information for the first HARQ process or the last HARQ process that has influence on the out-of-order HARQ process. When out-of-order HARQs occur within a range that does not exceed the number of out-of-order HARQ processes that the UE is able to support, the UE transmits the second signal corresponding to the first signal based on the equation 1 or equation 2, in operation 710.

Figure 8:
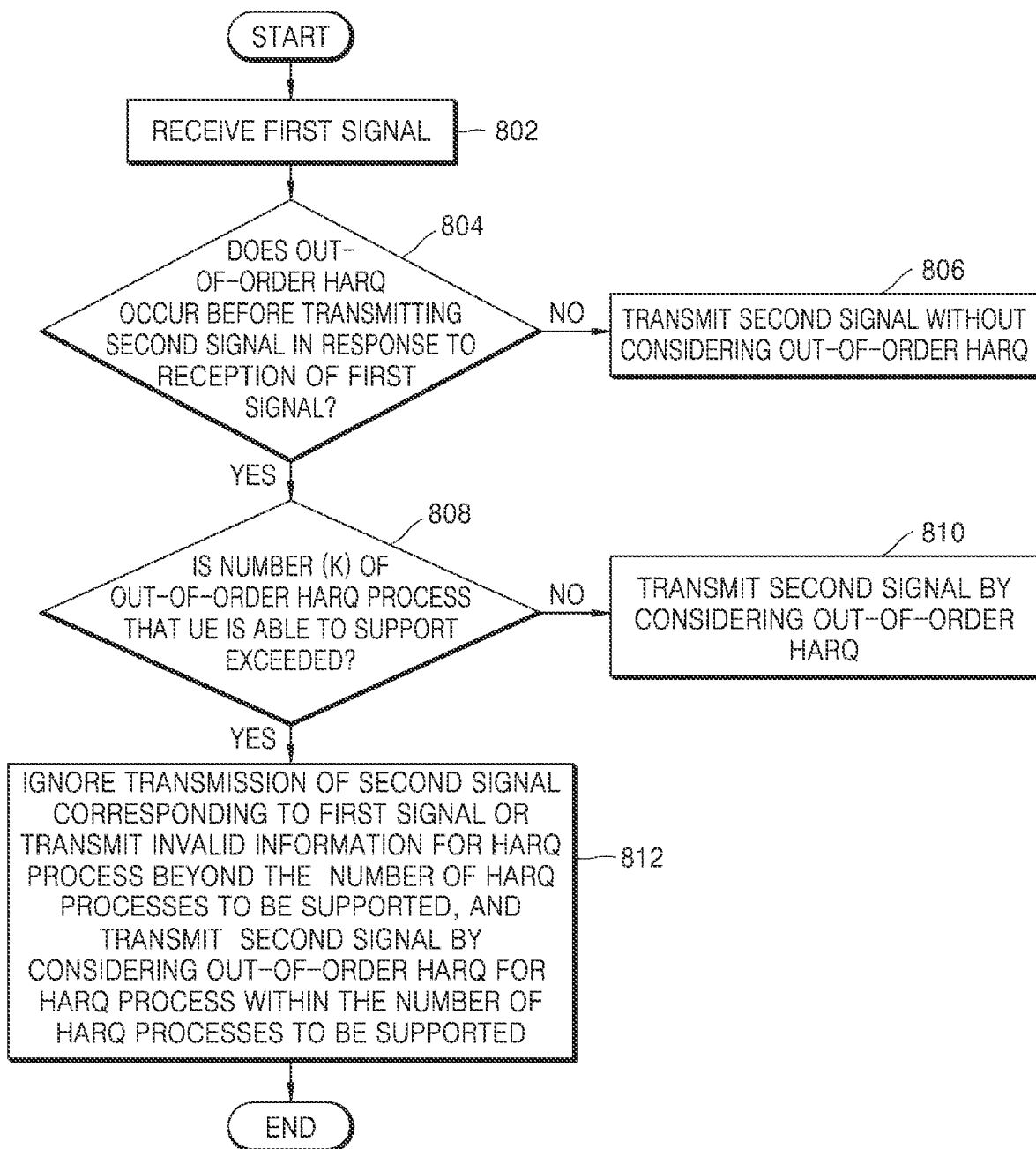
FIG. 8 is a flowchart illustrating operation of a terminal based on an occurrence of out-of-order HARQ and the number of out-of-order HARQ processes that the terminal is able to support, when the terminal receives a first signal and in response, transmits a second signal in a 5G or NR system, according to an embodiment of the disclosure.

FIG. 8 is a flowchart illustrating operation of a UE based on an occurrence of out-of-order HARQ and the number of out-of-order HARQ processes that the UE is able to support, when the UE receives a first signal and in response, transmits a second signal in a 5G or NR system, according to an embodiment of the disclosure.

A UE receives a first signal, in operation 802. Subsequently, whether an out-of-order HARQ for the first signal occurs before transmission of a second signal corresponding to the first signal is determined, in operation 804. In this case, the definition as described above in connection with FIG. 5 is applied to a condition for determining an occurrence of out-of-order HARQ.

When no out-of-order HARQ occurs, the UE transmits the second signal in response to reception of the first signal without considering the out-of-order HARQ. Specifically, the UE determines whether to transmit the second signal in response to reception of the first signal based on the processing time expressed in the equation 1 or equation 2. When the first signal is a PDSCH and the second signal is HARQ-ACK, the UE calculates the processing time based on the equation 1, and on the other hand, when the first signal is UL grant DCI and the second signal is UL data, the UE calculates the processing time based on the equation 2.

When the out-of-order HARQ occurs, the UE compares the number of out-or-order HARQ processes that the UE is able to support with the number of out-of-order HARQ processes that have actually occurred, in operation 808. When the number of out-of-order HARQ processes that have actually occurred is equal to or smaller than the number of out-or-order HARQ processes that the UE is able to support, the UE transmits the second signal in response to reception of the first signal by considering the out-of-order HARQ, in operation 810. Specifically, the UE determines whether to transmit the second signal in response to reception of the first signal based on the processing time expressed in the equation 1, equation 2, equation 3, equation 4, equation 5, or equation 6. When the first signal is a PDSCH and the second signal is HARQ-ACK, the UE calculates the processing time based on the equation 1, equation 3, or equation 4, and on the other hand, when the first signal is UL grant DCI and the second signal is UL data, the UE calculates the processing time based on the equation 2, equation 5, or equation 6.

A variable $d_{1,3}$ defined in the equation 3 or equation 4 may further reflect the number of out-of-order HARQ processes that the UE is able to support in addition to the aforementioned conditions of FIG. 6. For example, when the number of out-of-order HARQ occurrences is greater than the number of out-of-order HARQ processes that the UE is able to support, $d_{1,3}$ may have a value defined to be greater than 0, or otherwise, $d_{1,3}$ may be 0. A variable $d_{2,4}$ defined in the equation 5 or equation 6 may further reflect the number of out-of-order HARQ processes that the UE is able to support in addition to the aforementioned conditions of FIG. 6. For example, when the number of out-of-order HARQ occurrences is greater than the number of out-of-order HARQ processes that the UE is able to support, $d_{2,4}$ may have a value defined to be greater than 0, or otherwise, $d_{2,4}$ may be 0.

When the number of out-of-order HARQ processes that have actually occurred is greater than the number of out-of-order HARQ processes that the UE is able to support, the UE may ignore transmission of the second signal corresponding to the first signal or transmit invalid information, in operation 812. Specifically, the UE may ignore transmission of the second signal corresponding to the first signal or transmit invalid information for an HARQ process beyond the number of HARQ processes that the UE is able to support, and for an HARQ process within the number of HARQ processes that the UE is able to support, transmit the second signal by considering the out-of-order HARQ. In general HARQ-ACK transmission, the UE transmits ACK or NACK, but the invalid information may refer to e.g., the ACK or NACK being invalid.

In an embodiment, when the number of out-of-order HARQ processes that have actually occurred is greater than the number of out-of-order HARQ processes that the UE is able to support, the UE determines whether to transmit the second signal in response to reception of the first signal based on the processing time expressed in the equation 1, equation 2, equation 3, equation 4, equation 5, or equation 6. A variable $d_{1,3}$ defined in the equation 3 or equation 4 may further reflect the number of out-of-order HARQ processes that the UE is able to support in addition to the aforementioned conditions of FIG. 6. For example, when the number of out-of-order HARQ occurrences is greater than the number of out-of-order HARQ processes that the UE is able to support, $d_{1,3}$ may have a value defined to be greater than 0, or otherwise, $d_{1,3}$ may be 0. A variable $d_{2,4}$ defined in the equation 5 or equation 6 may further reflect the number of out-of-order HARQ processes that the UE is able to support in addition to the aforementioned conditions of FIG. 6. For example, when the number of out-of-order HARQ occurrences is greater than the number of out-of-order HARQ processes that the UE is able to support, $d_{2,4}$ may have a value defined to be greater than 0, or otherwise, $d_{2,4}$ may be 0.

In an embodiment, when the number of out-of-order HARQ processes that have actually occurred than the number of out-of-order HARQ processes that the UE is able to support, the UE may not expect to be scheduled in an out-of-order HARQ operation scheduled beyond the number of out-of-order HARQ processes that the UE is able to support. Specifically, on an occasion when the number of out-of-order HARQ processes that the UE is able to support is 2, the UE does not expect to be scheduled from the BS to have the number of out-of-order HARQ processes that actually occur be 3 or more. For extra out-of-order HARQ scheduling, the UE may ignore transmission of the second signal or transmit an invalid value.

In an embodiment, $d_{1,3}$ included in the equation 3 to equation 4 may be used by applying the following table 9. Table 9 represents values of $d_{1,3}$ according to the number of out-of-order HARQ processes and the number of out-of-order HARQ processes that the UE is able to support.

TABLE 9

| Number of out-of-order HARQ processes that | Number of out-of-order HARQ processes that have occurred | | | | |
|---|---|---|---|---|---|
| UE is able to support | 1 | 2 | 3 | ... | ... |
| d1,3[OFDN symbol unit or time unit] | a | b | c | ... | ... | where a, b, c, . . . may be preset values. Furthermore, although a, b, c, . . . are different letters used for convenience, they may have the same value.

In an embodiment, $d_{2,4}$ included in the equation 5 to equation 6 may be used by applying the following table 10. Table 10 represents values of $d_{2,4}$ according to the number of out-of-order HARQ processes and the number of out-of-order HARQ processes that the UE is able to support.

TABLE 10

| Number of out-of-order HARQ processes that | Number of out-of-order HARQ processes that have occurred | | | | |
|---|---|---|---|---|---|
| UE is able to support | 1 | 2 | 3 | ... | ... |
| d2,4[OFDM symbol unit or time unit] | a | b | c | ... | ... | where a, b, c, . . . may be preset values. Furthermore, although a, b, c, . . . are different letters used for convenience, they may have the same value.

Figure 9:
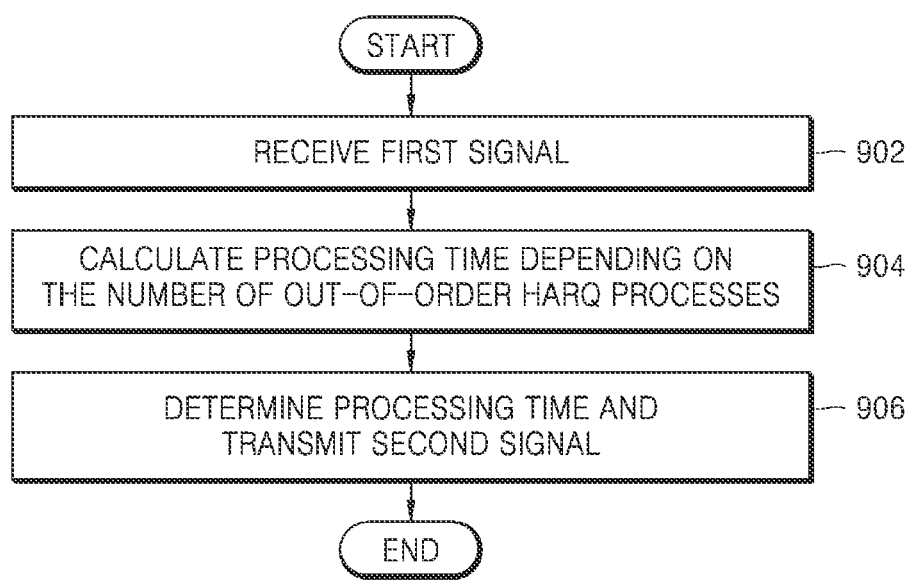
FIG. 9 is a flowchart illustrating a method by which a terminal determines transmission timing of a second signal when the terminal receives a first signal and in response, transmits the second signal in a 5G or NR system, according to an embodiment of the disclosure.

FIG. 9 is a flowchart illustrating a method by which a UE determines transmission timing of a second signal when the UE receives a first signal and in response, transmits the second signal in a 5G or NR system, according to an embodiment of the disclosure.

In the disclosure, a process in which a BS and a UE use the number of out-of-order HARQ processes to determine a processing time is included. After the UE receives the first signal in operation 902, a processing time is calculated according to the number of out-of-order HARQ processes from the perspective of an HARQ process including the first signal in operation 904. After this, the UE determines the processing time and transmits the second signal, in operation 906. This will be described in more detail below.

In the 5G or NR system, when the BS transmits a PDSCH including DL data, DCI that schedules the PDSCH indicates a $K_1$ value corresponding to timing information at which the UE transmits HARQ-ACK information for the PDSCH. Unless the HARQ-ACK information with timing advance included is indicated to be transmitted earlier than OFDM symbol $L_1$, the UE may transmit the HARQ-ACK information to the BS. In other words, with the timing advance included, the HARQ-ACK information may be transmitted from the UE to the BS at the same timing as or later than the OFDM symbol $L_1$. When the HARQ-ACK information with the timing advance included is indicated to be transmitted earlier than the OFDM symbol $L_1$, the HARQ-ACK information may not be valid HARQ-ACK information in the HARQ-ACK transmission from the UE to the BS. The OFDM symbol $L_1$ may be the first OFDM symbol in which cycle prefix (CP) starts after $T_{proc,1}$ from the last time of the last OFDM symbol of the PDSCH. $T_{proc,1}$ may be calculated as in equation 7 below:

$$T_{proc,1} = ((N_1 + d_{1,1} + d_{1,2})(2048+144) \cdot \kappa 2^{-\mu}) \cdot T_C \quad \text{[Equation 7]}$$

In the equation 7, $N_1$, $d_{1,1}$, $d_{1,2}$, $\kappa$, $\mu$, and $T_c$ may be defined as follows:

$N_1$ is based on the value of p presented in Table 7 and Table 8, and corresponds to $\mu$ among $(\mu_{PDCCH}, \mu_{PDSCH}, \mu_{UL})$ that generates the largest $T_{proc,1}$. That is, $\mu = \min(\mu_{PDCCH}, \mu_{PDSCH}, \mu_{UL})$. Of the aforementioned expressions, $\mu_{PDCCH}$ refers to SCS applied to PDCCH scheduling. $\mu$PDSCH refers to SCS applied to a scheduled PDSCH. $\mu_{UL}$ refers to SCS of a UL channel on which HARQ-ACK is transmitted.

$d_{1,1}=0$ when HARQ-ACK information is transmitted on a PUCCH (UL control channel), and $d_{1,1}=1$ when HARQ-ACK information is transmitted on a PUSCH (UL shared channel, data channel).

when the UE is configured with a plurality of active configuration carriers or carriers, a maximum timing difference between carriers may be reflected in transmission of the second signal.

for the PDSCH mapping type A, i.e., in a case that the first DMRS OFDM symbol is positioned in the third or fourth OFDM symbol of a slot, when the position index i of the last OFDM symbol is smaller than 7, $d_{1,2}=7-i$. Otherwise, $d_{1,2}=0$.

for the PDSCH mapping type B for UE processing capability 1, i.e., in a case that the first DMRS OFDM symbol is positioned in the first OFDM symbol of the PDSCH, $d_{1,2}=3$ when the PDSCH has the length of 4 OFDM symbols, or $d_{1,2}=3+d$ when the PDSCH has the length of 2 OFDM symbols, where d is the number of overlapping OFDM symbols between the PDSCH and a PDCCH including a control signal for scheduling the PDSCH. Otherwise, $d_{1,2}=0$.

for the PDSCH mapping type B for UE processing capability 2, i.e., in a case that the first DMRS OFDM symbol is positioned in the first OFDM symbol of the PDSCH, $d_{1,2}$ is the number of overlapping OFDM symbols between the PDSCH and a PDCCH including a control signal for scheduling the PDSCH when the length of the PDSCH is 2 or 4. Otherwise, $d_{1,2}=0$.

$N_1$ is defined according to p as in the following Table 11 or Table 12. $\mu=0$, 1, 2, and 3 refer to SCS 15 kHz, 30 kHz, 60 kHz, 120 kHz, respectively. Table 11 represents PDSCH processing time for PDSCH processing capability 1, and Table 12 represents PDSCH processing time for PDSCH processing capability 2.

TABLE 11

| μ Out-of-order HARQ Process | PDSCH decoding time $N_1$ (symbols) | | | | | | | | |
|---|---|---|---|---|---|---|---|---|---|
| | No additional PDSCH DM-RS configured | | | | | Additional PDSCH DM-RS configured | | | |
| Count | 0 | 1 | 2 | 3 | ... | 0 | 1 | 2 | 3 | ... |
| 0 | 8 | a | b | c | ... | 13 | a | n | o | ... |
| 1 | 10 | d | e | f | ... | 13 | p | q | r | ... |
| 2 | 17 | g | h | i | ... | 20 | s | t | u | ... |
| 3 | 20 | j | k | l | ... | 24 | v | w | x | ... |

TABLE 12

| μ Out-of-order HARQ Process | PDSCH decoding time $N_1$ (symbols) | | | | | | | | |
|---|---|---|---|---|---|---|---|---|---|
| | No additional PDSCH DM-RS configured | | | | | Additional PDSCH DM-RS configured | | | |
| Count | 0 | 1 | 2 | 3 | ... | 0 | 1 | 2 | 3 | ... |
| 0 | 3 | a | b | c | ... | 13 | j | k | l | ... |
| 1 | 4.5 | d | e | f | ... | 13 | m | n | o | ... |
| 2 | 9 for FR 1 | g | h | i | ... | 20 | p | q | r | ... | where a, b, c ... v, w, x may be preset values. Furthermore, although a, b, c ... v, w, x are different letters used for convenience, they may have the same value.

the aforementioned value of $N_1$ may be used with Table 11 or Table 12 according to UE capability.

$$T_c = 1/(\Delta f\!f_{max} \cdot ()), \Delta f3_{max} \text{ Hz},$$

$$N_f = 4096, k = T_s/T_c = 64, T_s = 1/(\Delta f_{ref} \cdot N_{f,ref}),$$

$$\Delta f_{ref} = 15 \cdot 10^3 \text{Hz, and } N_{f,ref} = 2048.$$

When the number of out-of-order HARQ processes goes beyond what is not configured in the table, the UE may not perform transmission of the second signal or perform transmission of an invalid second signal. Out-of-order HARQ related values presented in Table 11 and Table 12 are only an example without being limited thereto, and other values may be used or configured by other tables with similar concepts. For example, there may be a separate table for determining the transmission time for each number of out-of-order HARQ processes.

Furthermore, in the 5G or NR system, when the BS transmits control information including UL scheduling grant, the UE may indicate a value of $K_2$ corresponding to information of timing at which the UE transmits UL data or a PUSCH.

Unless the PUSCH with timing advance included is indicated to be transmitted earlier than OFDM symbol $L_2$, the UE may transmit the PUSCH to the BS. In other words, with the timing advance included, the PUSCH may be transmitted from the UE to the BS at the same timing as or later than the OFDM symbol $L_2$. When the PUSCH with timing advance included is indicated to be transmitted earlier than OFDM symbol $L_2$, the UE may discard the UL scheduling grant control information from the BS. The OFDM symbol $L_2$ may be the first OFDM symbol in which cycle prefix (CP) of a PUSCH OFDM symbol to be transmitted starts after $T_{proc,2}$ from the last time of the last OFDM symbol of the PDCCH including the scheduling grant. $T_{proc,2}$ may be calculated as in equation 8 below:

$$T_{proc,2} = \max\{((N_2 + d_{2,1} + d_{2,2})(2048 + 144) \cdot \kappa 2^{-\mu}) \cdot T_C, d_{2,3}\} \quad \text{[Equation 8]}$$

In the equation 8, $N_2$, $d_{2,1}$, $d_{2,2}$, $d_{2,3}$, κ, μ, and $T_C$ may be defined as follows:

$N_2$ is based on the value of p presented in Table 11 and Table 12, and corresponds to μ among ($\mu_{DL}, \mu_{UL}$) that generates the largest $T_{proc,1}$. That is, $\mu = \min(\mu_{DL}, \mu_{UL})$. Of the aforementioned expressions, $\mu_{DL}$ refers to SCS with which a PDSCH including DCI that schedules a PUSCH is transmitted. $\mu_{UL}$ refers to SCS of a UL channel on which the PUSCH is transmitted.

when the first of OFDM symbols allocated the PUSCH includes only DMRS, $d_{2,1}=0$, and otherwise, $d_{2,1}=1$.

when HARQ-ACK is multiplexed in the PUSCH scheduled as described above, $d_{2,2}=1$, and otherwise, $d_{2,2}=0$.

when the UE is configured with a plurality of active configuration carriers or carriers, a maximum timing difference between carriers may be reflected in transmission of the second signal.

when DCI indicating bandwidth part (BWP) switching is scheduled, $d_{2,3}$ refers to a time required for BWP switching. Otherwise, $d_{2,3}=0$.

$N_2$ is defined according to p as in the following Table 13 or Table 14. μ=0, 1, 2, and 3 refer to SCS 15 kHz, 30 kHz, 60 kHz, 120 kHz, respectively. Table 13 represents PUSCH preparation time for UE processing capability 1, and Table 14 represents PUSCH preparation time for UE processing capability 2.

TABLE 13

| Out-of-order HARQ Process Count | μ PUSCH preparation time $N_2$ [symbols] | | | | |
|---|---|---|---|---|---|
| | 0 | 1 | 2 | 3 | ... |
| 0 | 10 | a | b | c | ... |
| 1 | 12 | d | e | f | ... |
| 2 | 23 | g | h | i | ... |
| 3 | 36 | j | k | l | ... |

TABLE 14

| Out-of-order HARQ Process Count | μ PUSCH preparation time $N_2$ [symbols] | | | | |
|---|---|---|---|---|---|
| | 0 | 1 | 2 | 3 | ... |
| 0 | 3 | a | b | c | ... |
| 1 | 4, 5 | d | e | f | ... |
| 2 | 9 for FR1 | g | h | i | ... | where a, b, c, ..., j, k, l may be preset values. Furthermore, although a, b, c, ..., j, k, l are different letters used for convenience, they may have the same value.

the aforementioned value of $N_2$ may be used with Table 13 or Table 14 according to UE capability.

$T_c = 1/(\Delta f\!f_{max}()), \Delta f3_{max}$ Hz, $N_f = 4096, k = T_s/T_c = 64, T_s = 1/(\Delta f_{ref} \cdot N_{f,ref})$, $\Delta f_{ref} = 15 \cdot 10^3$ Hz, and $N_{f,ref} = 2048$.

When the number of out-of-order HARQ processes goes beyond what is not configured in the table, the UE may not perform transmission of the second signal or perform transmission of an invalid second signal. Out-of-order HARQ related values presented in Table 13 and Table 14 are only an example, and other values may be used or configured by other tables with similar concepts. For example, there may be a separate table for determining the transmission time for each number of out-of-order HARQ processes.

Figure 10:
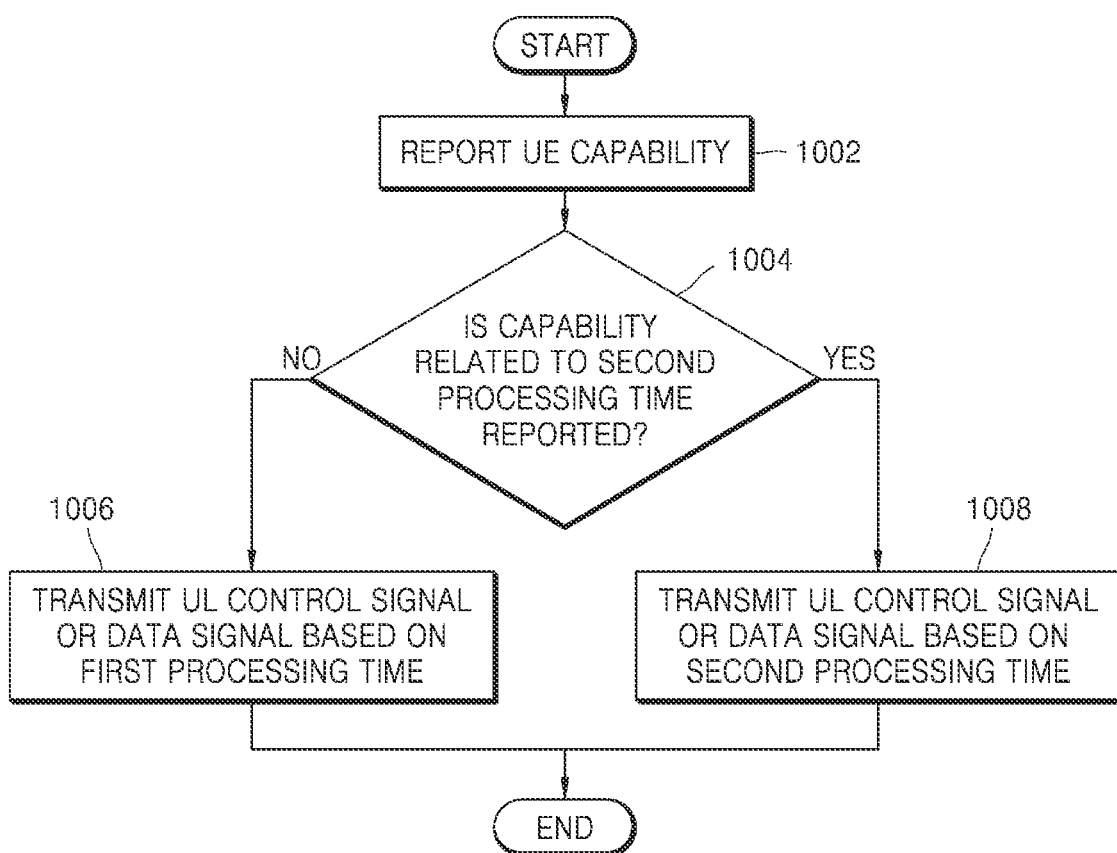
FIG. 10 illustrates a procedure for configuring a processing time type of a terminal based on content of a capability report of the terminal in a 5G or NR system, according to an embodiment of the disclosure.

FIG. 10 is a diagram illustrating a procedure for configuring a processing time type of a UE based on content of a capability report of the UE in a 5G or NR system, according to an embodiment of the disclosure.

A UE reports UE capability to a BS, in operation 1002.

In an embodiment, when PDSCH processing capability 2 is included in the capabilities reported by the UE in operation 1004, a value of the variable $N_1$ in $T_{proc,1}$ is defined in Table 4, and the UE uses the value to determine a processing time in operation 1008. When PDSCH processing capability 2 is not included in the capabilities reported by the UE in operation 1004, a value of the variable $N_1$ in $T_{proc,1}$ is defined in Table 3, and the UE uses the value to determine a processing time in operation 1006.

In an embodiment, when PUSCH timing capability 2 is included in the capabilities reported by the UE in operation 1004, a value of the variable $N_2$ in $T_{proc,2}$ is defined in Table 6, and the UE uses the value to determine a processing time in operation 1008. When PUSCH timing capability 2 is not included in the capabilities reported by the UE in operation 1004, a value of the variable $N_2$ in $T_{proc,2}$ is defined in Table 5, and the UE uses the value to determine a processing time in operation 1006.

Figure 11:
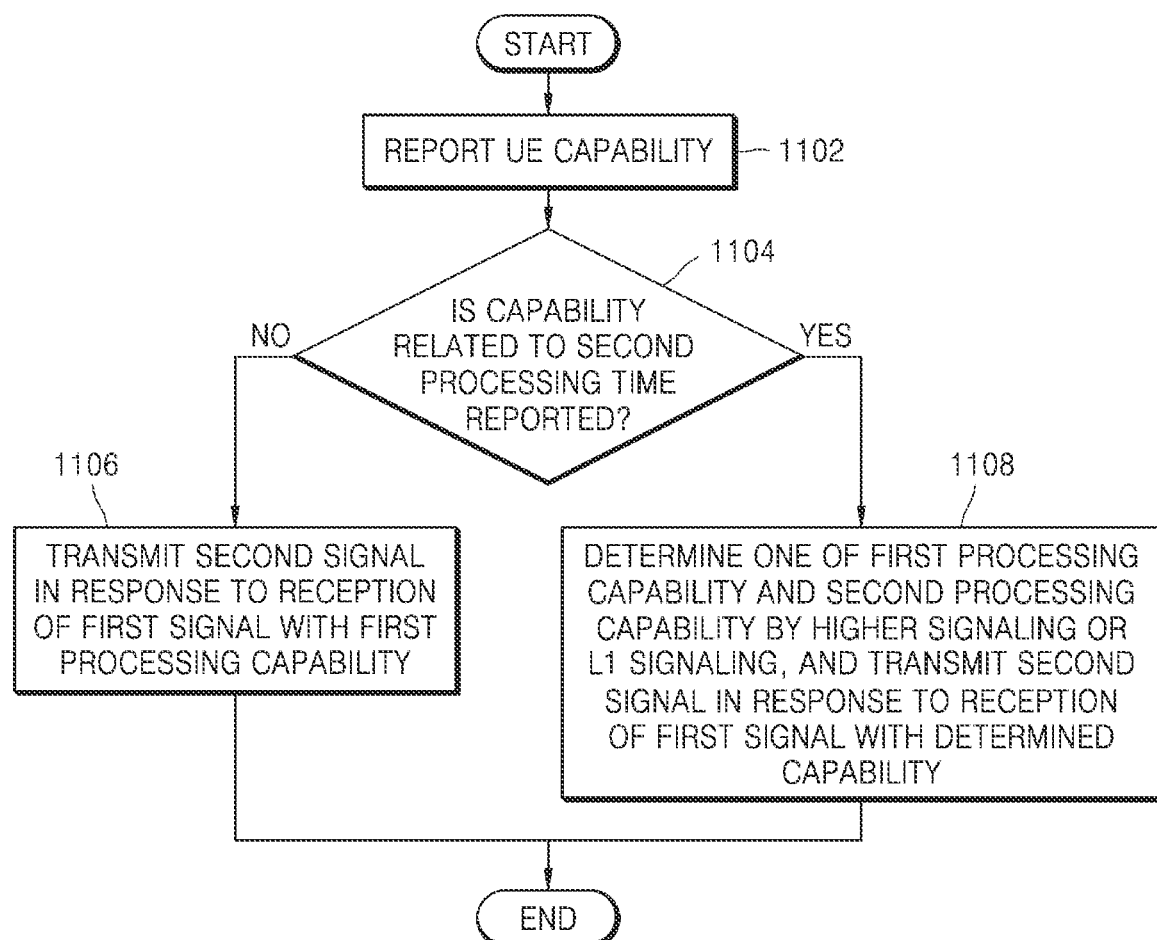
FIG. 11 illustrates a procedure for configuring a processing time type of a terminal based on content of a capability report of the terminal in a 5G or NR system, according to another embodiment of the disclosure.

FIG. 11 illustrates a procedure for configuring a processing time type of a UE based on content of a capability report of the UE in a 5G or NR system, according to another embodiment of the disclosure.

In an embodiment, a UE reports UE capability to a BS, in operation 1102.

When PDSCH processing capability 2 is included in the capabilities reported by the UE in operation 1104, a value of the variable $N_1$ in $T_{proc,1}$ is defined by one of Table 3 or table 4 selected by higher signaling or $L_1$ signaling, and the UE uses the value to determine a processing time in operation 1108. For example, when the BS indicates Table 4 by higher signaling, the UE may use Table 4 to determine the value of the variable $N_1$ in the processing time $T_{proc,1}$ for separately scheduled first signal and corresponding second signal. Furthermore, when the BS indicates Table 3 by higher signaling, the UE may use Table 3 to determine the value of the variable $N_1$ in the processing time $T_{proc,1}$ for separately scheduled first signal and corresponding second signal.

In this case, the L1 signaling may have a DCI format or a radio network temporary identifier (RNTI), and the UE may determine whether the value of the variable $N_1$ in the processing time $T_{proc,1}$ uses Table 4 or Table 5 according to the detected DCI format. For example, when scheduled with fallback DCI (DCI format 1_0), the UE may use Table 4 to determine the value of the variable $N_1$ in the processing time $T_{proc,1}$ for the scheduled first signal and corresponding second signal, and when scheduled with DCI for URLLC (e.g., DCI format 3_x having a size smaller than the fallback DCI), the UE may use Table 5 to determine the value of the variable $N_1$ in the processing time $T_{proc,1}$ for the scheduled first signal and corresponding second signal. In another example, when scheduled with a DCI format including CRC scrambled by a C-RNTI, a CS-RNTI, or an RA-RNTI, the UE may use Table 4 to determine the value of the variable $N_1$ in the processing time $T_{proc,1}$ for the scheduled first signal and corresponding second signal. When scheduled with a DCI format including CRC scrambled by a new-RNTI or an RNTI supported for the purpose of a URLLC service (e.g., UC-RNTI), the UE may use Table 5 to determine the value of the variable $N_1$ in the processing time $T_{proc,1}$ for the scheduled first signal and corresponding second signal.

When PDSCH processing capability 2 is not included in the capabilities reported by the UE in operation 1104, a value of the variable $N_1$ in $T_{proc,1}$ is defined in Table 3, and the UE uses the value to determine a processing time in operation 1106.

In another embodiment, a UE reports UE capability to a BS, in operation 1102.

When PUSCH processing capability 2 is included in the capabilities reported by the UE in operation 1104, a value of the variable $N_2$ in $T_{proc,2}$ is defined by one of Table 5 or table 6 selected by higher signaling or L1 signaling, and the UE uses the value to determine a processing time in operation 1108. For example, when the BS indicates Table 6 by higher signaling, the UE may use Table 6 to determine the value of the variable $N_2$ in the processing time $T_{proc,2}$ for separately scheduled first signal and corresponding second signal. Furthermore, when the BS indicates Table 5 by higher signaling, the UE may use Table 5 to determine the value of the variable $N_2$ in the processing time $T_{proc,2}$ for separately scheduled first signal and corresponding second signal.

In this case, the L1 signaling may have a DCI format or a radio network temporary identifier (RNTI), and the UE may determine whether the value of the variable $N_2$ in the processing time $T_{proc,2}$ uses Table 5 or Table 6 according to the detected DCI format. For example, when scheduled with fallback DCI (DCI format 0_0), the UE may use Table 5 to determine the value of the variable $N_1$ in the processing time $T_{proc,1}$ for the scheduled first signal and corresponding second signal, and when scheduled with DCI for URLLC (e.g., DCI format 3_x having a size smaller than the fallback DCI), the UE may use Table 6 to determine the value of the variable $N_2$ in the processing time $T_{proc,2}$ for the scheduled first signal and corresponding second signal. In another example, when a DCI format including CRC scrambled by a C-RNTI, a CS-RNTI, or an RA-RNTI is scheduled, the UE may use Table 6 to determine the value of the variable $N_2$ in the processing time $T_{proc,2}$ for the scheduled first signal and corresponding second signal. When a DCI format including CRC scrambled by a new-RNTI or an RNTI supported for the purpose of a URLLC service (e.g., UC-RNTI) is scheduled, the UE may use Table 6 to determine the value of the variable $N_2$ in the processing time $T_{proc,2}$ for the scheduled first signal and corresponding second signal.

When PUSCH processing capability 2 is not included in the capabilities reported by the UE in operation 1104, a value of the variable $N_2$ in $T_{proc,2}$ is defined in Table 6, and the UE uses the value to determine a processing time in operation 1106.

Figure 12:
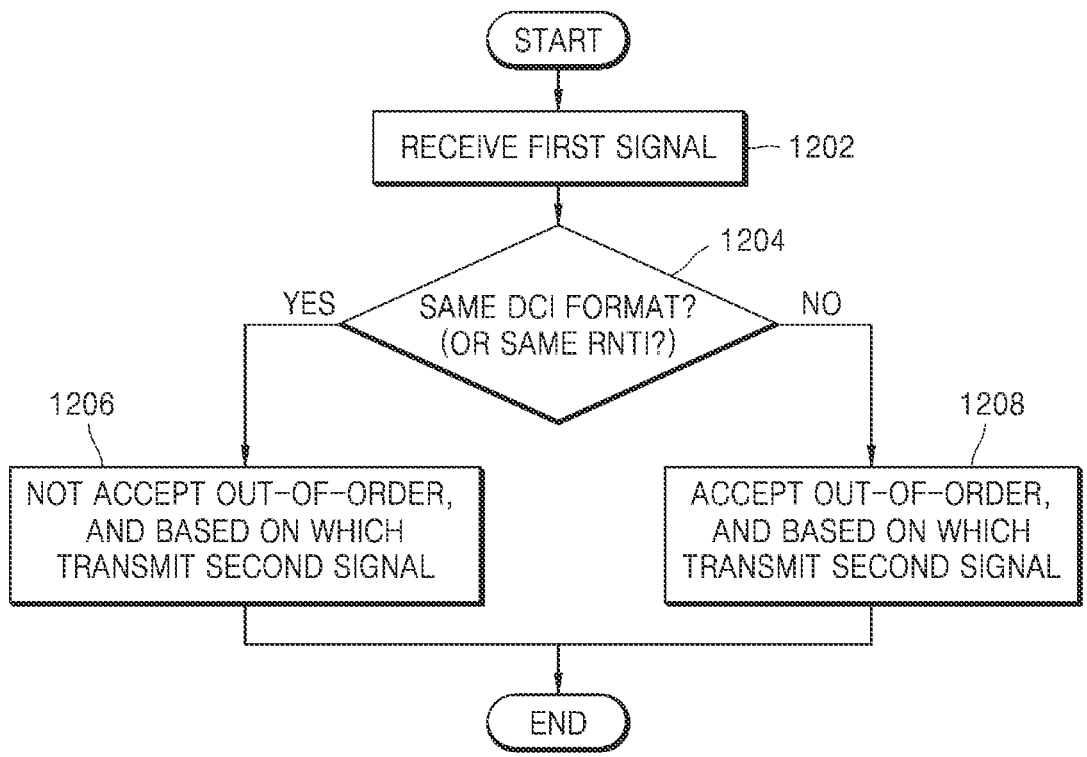
FIG. 12 is a diagram for describing a condition in which out-of-order HARQ scheduling for a terminal occurs in a 5G or NR system, according to another embodiment of the disclosure.

FIG. 12 is a diagram for describing a condition in which out-of-order HARQ scheduling for a UE occurs in a 5G or NR system, according to another embodiment of the disclosure.

A UE receives a first signal, in operation 1202. After receiving the first signal, the UE detects DCI before transmitting a second signal corresponding to the first signal, and determines whether the DCI has the same DCI format as previous DCI, in operation 1204. When the DCI format of the corresponding DCI is the same as the previous DCI format or is detected by the same RNTI, the UE may determine that an HARQ indicated in the DCI does not accept an out-of-order HARQ, in operation 1206. When the DCI format is different from the previous DCI format or is detected by a different RNTI, the UE may determine that the HARQ indicated in the DCI accepts an out-of-order HARQ, in operation 1208. In an embodiment having the same DCI format means that the DCI is detected in the same search space. The same search space may be a search space having the same index, or may be classified as UE-common search or UE-specific search space. For example, even with different indexes, all the DCI detected in the UE-common search space may be determined as having the same DCI format.

In an embodiment, in a situation confined to PDSCHs being scheduled in the same DCI format or being scheduled in a DCI format including CRC scrambled by the same RNTI, the UE may receive a PDSCH in an i'th slot, transmit HARQ-ACK for the PDSCH in a j'th slot, receive another PDSCH in a slot after the i'th slot, and determine not to transmit HARQ-ACK for the other PDSCH in a slot before the j'th slot.

In an embodiment, in a situation confined to PDSCHs being scheduled in the same DCI format or being scheduled in a DCI format including CRC scrambled by the same RNTI, the UE may receive a PDSCH in an i'th OFDM symbol, transmit HARQ-ACK for the PDSCH in a j'th OFDM symbol, receive another PDSCH in an OFDM symbol after the i'th OFDM symbol, and determine not to transmit HARQ-ACK for the other PDSCH in an OFDM symbol before the j'th OFDM symbol.

In an embodiment, in a situation confined to PUSCHs being scheduled in the same DCI format or being scheduled in a DCI format including CRC scrambled by the same RNTI, the UE may receive UL grant in an i'th OFDM symbol, transmit an PUSCH for the UL grant in a j'th OFDM symbol, receive another UL grant in an OFDM symbol after the i'th OFDM symbol, and determine not to transmit a PUSCH for the other UL grant in an OFDM symbol before the j'th OFDM symbol.

Figure 13:
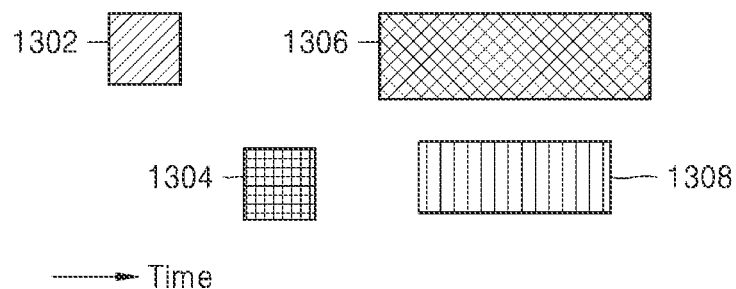
FIG. 13 illustrates a method of processing a second signal in a situation where first signals have overlapping scheduling.

FIG. 13 illustrates a method of processing a second signal in a situation where first signals have overlapping scheduling.

In FIG. 13, a UE receives DL control information 1302 and 1304 that schedules first signals 1306 and 1308. The first signal may correspond to data information to be transmitted in DL, a reference signal for channel estimation, or the like. The DL control information refers to information transmitted on a DL control channel (PDCCH). As in FIG. 13, in a situation where the UE is scheduled with the first signal 1306 in the DL control information 1304, the UE may be scheduled with the other first signal 1308 in the other DL control information 1304. However, it may not be possible for the UE to receive the two first signals 1306 and 1308 with overlapping schedules in at least one OFDM symbol. Despite this, the reason that the BS is able to make this scheduling is that the first signal 1306 may be an eMBB related signal and the other first signal 1308 may be a URLLC related signal. In other words, as the URLLC related signal requires higher reliability and lower latency than the eMBB, it is possible for the BS to schedule the URLLC earlier than the eMBB when the URLLC related traffic occurs even after the BS schedules the first signal 1306 first. Accordingly, the BS may schedule the other first signal 1308 in a region at least partially overlapping a time resource region of the scheduled first signal 1306.

In an embodiment, when time resource regions of the first signals scheduled by the two pieces of DL control information 1302 and 1304 overlap in at least one OFDM symbol, the UE may receive only the first signal 1308 scheduled by the DL control information 1304 transmitted later in time among the two pieces of DL control information, and report a second signal in response to the first signal 1308.

In an embodiment, when time resource regions of the first signals scheduled by the two pieces of DL control information 1302 and 1304 overlap in at least one OFDM symbol, the UE may not receive the first signal 1306 scheduled by the DL control information 1302 transmitted earlier in time among the two pieces of DL control information, and may not report (or may drop or ignore, or may report in NACK or in arbitrary value) a second signal in response to the first signal 1308.

In an embodiment, when time resource regions of the first signals scheduled by the two pieces of DL control information 1302 and 1304 overlap in at least one OFDM symbol, the UE may only report a second signal in response to the first signal 1308 scheduled by the DL control information 1304 transmitted later in time among the two pieces of DL control information.

In an embodiment, when time resource regions of the first signals scheduled by the two pieces of DL control information 1302 and 1304 overlap in at least one OFDM symbol, the UE may not report (or may drop or ignore, or may report in NACK or in arbitrary value) a second signal in response to the first signal 1306 scheduled by the DL control information 1302 transmitted earlier in time among the two pieces of DL control information.

In an embodiment, when time resource regions of the first signals scheduled by the two pieces of DL control information 1302 and 1304 overlap in at least one OFDM symbol, the UE may not expect transmission of a second signal in response to the first signal 1306 scheduled by the DL control information 1302 transmitted earlier in time among the two pieces of DL control information.

When the first signal is a PDSCH, the second signal may be HARQ-ACK information, and when the first signal is a reference signal for channel estimation, the second signal may be a report value of a channel measurement result for the reference signal.

Control information for scheduling an eMBB signal or a URLLC signal may be distinguished by DCI formats, RNTIs scrambled in DCI, or scrambling methods performed in generating DCI. For example, in the case of distinguishing by the scrambling method, the method may distinguish between a URLLC signal and an eMBB signal according to the following equation 9, or may be generally used for indicating traffic with priority.

$$c_{init} = (n_{RNTI} \cdot 2^{16} + N_{priority} \cdot 2^x + n_{Id}) \bmod 2^{31} \quad \text{[Equation 9]}$$

where $n_{RNTI}$ is a value given by a C-RNTI in the UE-specific search space of the PDCCH through a higher signal, and is deemed '0' when there is no corresponding higher signal configuration. $N_{ID}$ has a value among $\{0, 1, \ldots, 2^{16-x}\}$ when there is higher configuration, and is equal to a cell ID to which the UE belongs when there is no higher configuration. Furthermore, the value of x may be additionally configured by a separate higher signal, or determined to be one of the values between 0 to 16 in a standard. $N_{priority}$ denotes a priority related to control information to be scrambled with corresponding $c_{init}$. Alternatively, it denotes a priority of the traffic scheduled in the control information. The greater or smaller the value is, the higher priority it has.

Accordingly, when detecting control information, the UE may directly figure out the priority of the control information based on the value of $N_{priority}$ obtained in a de-scrambling process. This enables the UE to determine which signal is to be ignored or processed, when the first or second signals scheduled in two pieces of control information overlap in a time or frequency resource region. For example, in a case that the greater the value of $N_{priority}$ the higher the priority, when a second signal scheduled in control information scrambled with the value of $N_{priority}$, 5, and a second signal scheduled in control information scrambled with the value of $N_{priority}$, 10 overlap in at least a time or frequency resource region, the UE ignores (or drops) the second signal scheduled in the control information scrambled with the value of $N_{priority}$, 5 and processes only the second signal scheduled in the control information scrambled with the value of $N_{priority}$, 10.

In an embodiment, when time resource regions of the first signals scheduled by the two pieces of DL control information 1302 and 1304 overlap in at least one OFDM symbol, the UE may expect to receive the first signal 1306 scheduled by the DL control information 1302 transmitted earlier in time among the two pieces of DL control information only in a resource region not overlapping in time with the first signal 1308 scheduled by the DL control information 1304 transmitted later. Specifically, in a case that the first signal 1306 is scheduled from the fifth symbol to the tenth symbol in a particular slot and then the other first signal 1308 is scheduled from the seventh symbol to the ninth symbol in the same slot, the UE may receive only resource regions corresponding to the fifth symbol, the sixth symbol, and the tenth symbol for the first signal 1306. That is, the UE may receive the two first signals 1306 and 1308 in a time multiplexing scheme (TDM) and may not expect to receive the first signal 1306 in a region overlapping in time with the second first signal 1308.

Although a situation where the first and second signals are scheduled by DL control information (or L1 signaling) is considered in FIG. 13, they may be configured by higher signals such as MAC CE or RRC signals without separate L1 DL control information. For example, the first and second signals may be configured by using semi-persistent scheduling (SPS), a periodic CSI process, or the like. Furthermore, it is also possible that one of the two first signals is scheduled by L1 signaling while the other one is configured by a higher signal. Moreover, the aforementioned operation may be applied only to a UE that is unable to receive two or more pieces of first signal information requiring second signals in a particular OFDM symbol.

Figure 14:
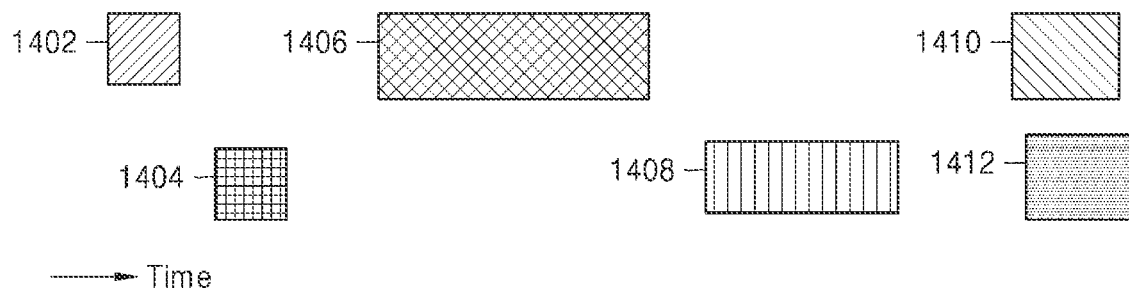
FIG. 14 illustrates a situation where second signals are overlapped.

FIG. 14 illustrates a situation where second signals are overlapped.

In FIG. 14, it is shown that a BS schedules a resource 1406 for a first signal and a resource 1410 for a second signal with first DL control information 1402, and then schedules a resource 1408 for a first signal and a resource 1412 for a second signal with second DL control information 1404. In this case, the resources 1410 and 1412 for the second signals are shown as being overlapped in at least one OFDM symbol. When the first signals are all eMBB related signals or all URLLC related signals, the overlapping second signals may usually be transmitted in the resource 1412 scheduled in the second DL control information 1404 finally scheduled later. In other words, this is a UL control information multiplexing scheme.

For example, when one first signal 1406 is an eMBB related signal and the other first signal 1408 is a URLLC related signal, the second signal for the URLLC related signal may have higher priority than the second signal for the eMBB related signal. Hence, UL control information not including the second signal for the eMBB related signal but including only the second signal for the URLLC related signal may be transmitted in the resource 1412 scheduled in the second DL control information 1404. In other words, it may be expected that the UE does not transmit (or drop) the second signal for the eMBB related signal and the scheduled resource 1410. When the second signal for the eMBB related signal is HARQ-ACK information, a situation may occur where the UE, although having received the first signal 1406 for eMBB, does not transmit HARQ-ACK information in response to the first signal 1406 to the BS. In this case, the BS may separately receive a second signal that has not been transmitted without retransmitting the first signal 1406 for eMBB in the following methods:

method 1: uses the same HARQ number and a particular
    MCS value (or resource allocation value)

After dropping HARQ-ACK, the UE may receive DL control information indicating the same HARQ process number as a PDSCH corresponding to the HARQ-ACK, and when the DL control information has a particular MCS value or a resource allocation value (or a combination thereof), the UE may determine that the DL control information is control information indicating only transmission of the HARQ-ACK that has been dropped before. For example, in a case that the UE has received a PDSCH corresponding to HARQ process No. 1 and dropped transmission of the corresponding HARQ-ACK due to the aforementioned situation, when subsequently received DL control information indicates the HARQ-ACK process No. 1, and the MCS value and the resource allocation field value are all indicated to be '1', the UE may determine that the DL control information indicates transmission of the previously dropped HARQ-ACK. In this case, the UE may transmit the dropped HARQ-ACK information in a PUCCH resource region indicated in the DL control information without actually receiving DL data information. A UE processing time value related to this may be as follows:

N=10 for 15 kHz, N=12 for 30 kHz, N=22 for 60 kHz, and N=25 for 120 kHz. For a UE with capability 2 [6, TS 36.214] in frequency range 1 and for the subcarrier spacing of the PDCCH reception, N=5 for 15 kHz, N=5.5 for 30 kHz, and N=11 for 60 kHz.

A unit of N in the above formula is an OFDM symbol unit.

Although a situation where the first and second signals are scheduled by DL control information (or L1 signaling) is considered in FIG. 14, they may be configured by higher signals such as MAC CE or RRC signals without separate L1 DL control information. For example, the first and second signals may be configured by using semi-persistent scheduling (SPS), a periodic CSI process, or the like. Furthermore, it is also possible that one of the two first signals is scheduled by L1 signaling while the other one is configured by a higher signal. Moreover, the aforementioned operation may be applied only to a UE that is unable to receive two or more pieces of first signal information requiring second signals in a particular OFDM symbol.

Figure 15:
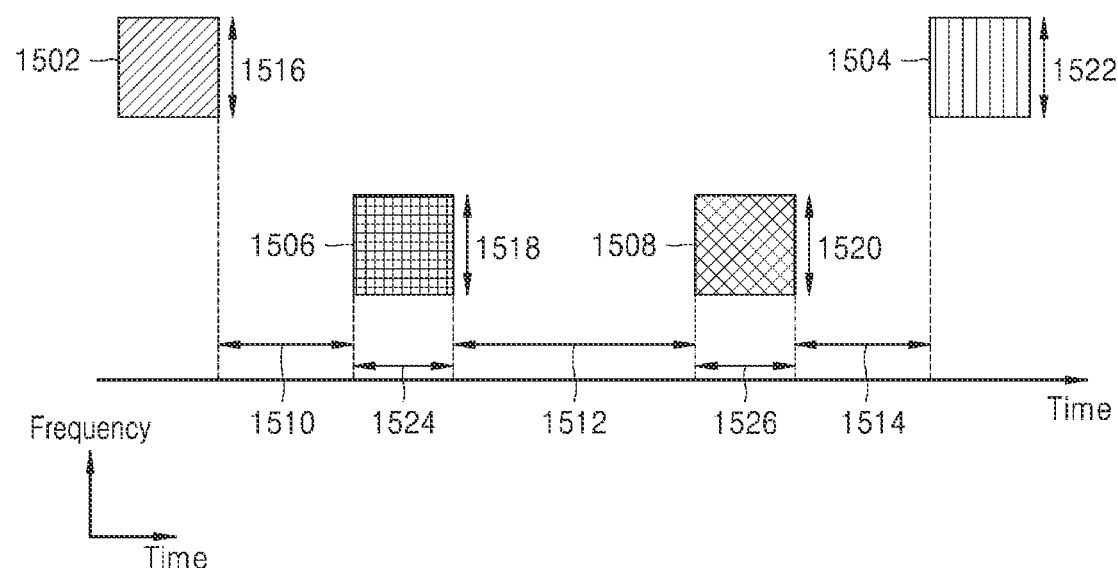
FIG. 15 is a diagram for describing operation of a terminal, according to an embodiment.

FIG. 15 is a diagram for describing operation of a UE, according to an embodiment.

In FIG. 15, it is shown that the UE transmits a second signal 1504 corresponding to a received first signal 1502 and transmits a second signal 1508 corresponding to another received first signal 1506 in a cell and in a BWP. The first signals may be PDSCHs or PDCCHs, and the second signals may be PUCCHs or PUSCHs including HARQ-ACK information for the PDSCH, or PUSCHs including UL data information for UL grant (the PDCCH). Alternatively, the second signals may be physical random access channels (PRACHs) or sound reference signals (SRSs) and the first signals may be channel state information reference signals (CSI-RSs). Although FIG. 15 illustrates a situation where the second signals 1504 and 1508 do not overlap in time each other, it is possible that some or all resources overlap in time.

Processing time A required by the UE to transmit the second signal 1504 corresponding to the received first signal 1502 and processing time B required by the UE to transmit the second signal 1508 corresponding to the other received first signal 1506 may be the same or may be different. Alternatively, in a situation where the two processes are out of order as in FIG. 15, the processing time A may be generally equal to or greater than the processing time B. Processing time is divided largely into PDSCH processing time of the UE for HARQ-ACK reporting and PUSCH processing time of the UE for PUSCH transmission for UL grant. The PDSCH processing time of the UE for HARQ-ACK reporting may have values in Table 3 or Table 4, and the processing values in Table 4 may be generally smaller than those in Table 3.

Similarly, the PUSCH processing time of the UE for UL grant may have values in Table 5 or Table 6, and the processing values in Table 6 may be generally smaller than those in Table 5. Table 3 and Table 5 may be called processing time capability 1, and Table 4 and Table 6 may be called processing time capability 2.

The UE may report whether to support the out-of-order scheduling as shown in FIG. 15 through a UE capability report in advance. In a case of supporting the out-of-order scheduling, it is also possible to add whether to process all or only one of the two second signals scheduled out of order to the UE capability report. The following methods are UE capability message types available for out-of-order support, and the UE may report at least one of the following UE capability messages to the BS. When the BS receives a report of multiple UE capabilities from a UE, the BS may indicate one of them to the UE in a higher signal. Apart from the higher signal, it is also possible to adaptively indicate it to the UE in an L1 signal. Types of the L1 signal may include a downlink control information (DCI) format, a radio network temporary identifier, a DCI field, control resource set (CORESET) configuration, search space configuration, etc. Types of the higher signal refer to signals delivered to an MAC layer, an RRC layer, etc., apart from the signal delivered to a PHY layer. When a UE does not report all the following capabilities, a UE BS?? may regard the UE as a UE that does not support out-of-order scheduling, and may not perform the out-of-order scheduling for the UE.

UE Capability 1: Out of Order Both

Out_of_order_both is a UE capability reported by the UE to the BS, and is information indicating that the UE is able to transmit all the second signals for the first signals scheduled out of order. Specifically, when the UE receives out_of_order_both related higher signal configuration from the BS after reporting the out_of_order_both to the BS, the UE may expect that the subsequently scheduled control and data information becomes out of order. When the out_of_order_both related higher signal configuration is not received, the control and data information may not be scheduled out of order. Alternatively, the aforementioned UE operation may be provided by reporting a UE capability, which is out_of_order_both, without the out_of_order_both related higher signal. When there is no such a UE capability report, the BS may determine to perform at least one of the following three detailed operations.

determining that out-of-order scheduling is not accepted the UE performs out-of-order scheduling but gives priority to processing the second signal 1508 corresponding to the secondly scheduled first signal 1506 and does or does not process the second signal 1504 for the firstly scheduled first signal 1502. Specifically, when the second signal 1504 is HARQ-ACK information, NACK or ACK may be transmitted or the HARQ-ACK information may not be transmitted. Furthermore, it is also possible not to perform processing of the PDSCH 1502 corresponding to the HARQ-ACK information. When the second signal 1504 is a PUSCH, the UE may or may not perform PUSCH transmission.

the UE performs out-of-order scheduling but gives priority to processing the second signal 1508 corresponding to the secondly scheduled first signal 1506 and does not perform processing the second signal 1504 corresponding to the firstly scheduled first signal 1502. Specifically, when the second signal 1504 is HARQ-ACK information, it may be possible for the UE to always transmit NACK. Furthermore, the UE may not receive nor process the PDSCH 1504 corresponding to the HARQ-ACK. When the second signal 1504 is a PUSCH, the UE may cancel the PUSCH transmission.

The aforementioned operations may be defined in one in a standard, or it is possible that one of a higher signal or an L1 signal may indicate a certain detailed operation.

UE Capability 2: Out of Order Second

Out of order second is a UE capability reported by the UE to the BS. When a higher signal is configured with the out_of_order_second, the UE may first process only the second signal 1504 scheduled later among the second signals corresponding to the first signals scheduled out of order, and may drop (or skip) the second signal 1508 scheduled earlier or leave it at the UE's discretion without having a separate definition of the UE operation.

UE Capability 3: Out of Order Condition

Out of order condition is a UE capability reported by the UE to the BS. Out_of_order_condition is a field to report a processing capability of the UE by determining whether to process all the second signals scheduled out of order or process only the second signal scheduled later among the second signals scheduled out of order according to a particular condition. When the out_of_order_condition is configured by a higher signal, the UE drops (or skips) the second signal 1504 scheduled earlier among the second signals scheduled out of order and processes the second signal 1508 scheduled later, when at least one of the following conditions is met. In another example, the UE processes all the second signals 1504 and 1508 scheduled out of order, when one of the following conditions is not met. Furthermore, the UE may consider only some of the following conditions. For example, the UE may consider only condition a-1 to be out_of_order_condition.

condition a-1: A minimum processing time a for the second signal 1504 corresponding to the first signal 1502 is greater than a minimum processing time b for the second signal 1508 corresponding to the first signal 1506. The minimum processing time may be determined by the size of frequency resources 1516, 1518, 1520, and 1522 for scheduling the first signal or the second signal. It is possible to determine a value of the processing time via a higher signal or L1 signal, in which case MAC or RRC may be available for the higher signal and a DCI format, DCI field, RNTI, or the like may be available for the L1 signal. The minimum processing time may be determined by Table 3 to Table 6, and may have a value greater than values in the table depending on the number of symbols overlapping a time resource for the DMRS mapping type or the control information and data. The processing capability may fall back in the following situations:

in a case that the firstly scheduled first signal is a PDSCH and the PDSCH is configured with capability 2, when a PDSCH on which an additional DMRS is actually scheduled based on a time resource region in which an additional DMRS is configured and a PDSCH is scheduled is present, the UE considers the processing time required for HARQ-ACK information for the PDSCH to fall back to capability 1 even when a higher signal is configured to request the capability 2.

in a case that the firstly scheduled first signal is a PDSCH and the PDSCH is configured with capability 1, when symbol length for which the PDSCH is scheduled is equal to or less than 7 symbols, and DMRS configuration of the PDSCH is mapping type B located in the first symbol among time resources allocated for the PDSCH, the UE considers the processing time required for the scheduling by additionally reflecting an extent of overlapping between the CORESET time resource region for scheduling the PDSCH and the time resource region for the PDSCH.

in a case that the firstly scheduled first signal is a PDSCH and the PDSCH is configured with capability 2, when the number of scheduled RBs for the PDSCH is 136 or more and the SCS with which the PDSCH is transmitted is 30 kHz, the UE considers that the processing time required for HARQ-ACK information for the PDSCH is operated with capability 1 even when a higher signal is configured to request the capability 2.

condition a-2: A time difference 1510 between the first signals 1502 and 1506 is less than a certain threshold condition a-3: A time difference 1514 between the second signals 1508 and 1504 is less than a certain threshold condition a-4: A particular time value 1510, 1524, 1512, 1526, or 1514 is smaller than a certain threshold condition a-5: A particular frequency allocation value 1516, 1518, 1520, or 1522 is larger than a certain threshold condition a-6: The UE supports carrier aggregation (CA) or supports multiple active bandwidth parts (BWPs) in a cell The aforementioned UE capability parameters are just examples, and may be fully replaced with different terms. Furthermore, without the presence of a UE capability, UE capability based UE operations may be reflected by BS settings or default.

The aforementioned processing value determination or the minimum processing value is a minimum processing time required by the UE to process the second signal in response to reception of the first signal as described above, and when the BS schedules the first signal and the second signal having a value smaller than the time, the UE may or may not process the second signal. Accordingly, only when the BS schedules the first signal and the second signal having values at least greater than the time, the UE may perform an operation expected by the BS.

In an embodiment, the UE does not encounter a situation where the processing value B for the second signal 1508 corresponding to the first signal 1506 is greater than the processing value A for the second signal 1504 corresponding to the first signal 1502. In other words, the UE is not scheduled with a situation where the processing value A is capability 2 having a smaller processing value as in Table 4 or Table 6 and the processing value B is capability 2 having a larger processing value as in Table 3 or Table 5. The UE regards such a case of being out-of-order scheduling as an error case.

In an embodiment, it is possible for the UE to report a UE capability related to the out-of-order scheduling to the BS. When the UE capability is reported, the BS configures the out-of-order scheduling in a higher signal, and after that, the UE is able to receive the out-of-order scheduling as in FIG. B 도 15?? Specifically, the higher signal may be divided into an out-of-order higher signal for PDSCH to HARQ-ACK and an out-of-order higher signal for PDCCH to PUSCH. When the UE is not configured with the higher signal related to the out-of-order scheduling from the BS or does not report the out-of-order UE capability to the BS, the UE is unable to receive the out-of-order scheduling. When the out-of-order scheduling is received, the UE may regard this as an error case and may or may not process the second signals 1504 and 1508 corresponding to the first signals 1502 and 1506** scheduled out of order.

In an embodiment, the UE may determine whether to adaptively process all the second signals corresponding to the first signals or process only the second signal scheduled later based on conditions a-1 to a-6 under the out_of_order_ condition.

In an embodiment, when the UE receives a multiple cell configuration, the UE may perform out-of-order scheduling of FIG. 15 between different cells. Such determination may also be determined by the UE capability, and whether to perform or to not perform the out-of-order scheduling only in the same cell or whether to perform or to not perform the out-of-order scheduling in the entire cells may be determined by the UE capability.

Figure 16:
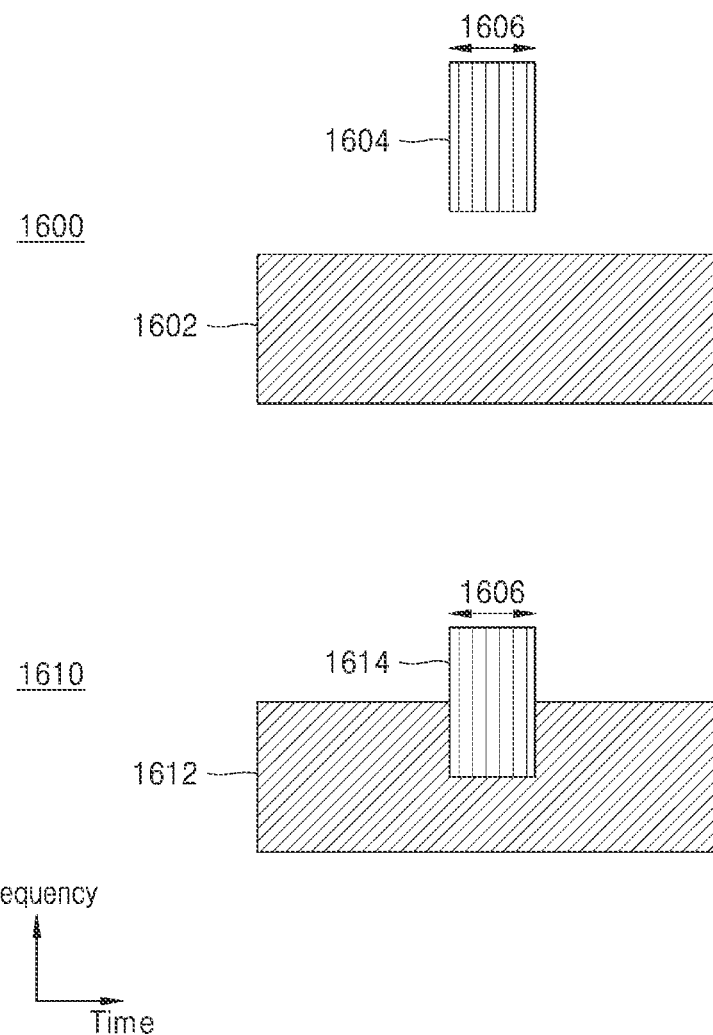
FIG. 16 is a diagram for describing operation of a terminal, according to another embodiment.

FIG. 16 is a diagram for describing operation of a UE, according to another embodiment.

In FIG. 16, 1600 illustrates a situation where first signals 1602 and 1604 such as PDSCHs or the second signals 1602 and 1604 such as PUSCHs are scheduled to at least partially overlap in time but not to overlap in frequency. In FIG. 16, although similar to 1600, 1610 shows a situation where first signals 1612 and 1614 or the second signals 1612 and 6114 are scheduled to partially overlap in time and frequency resources. For example, this may correspond to a case that a DCI format supporting eMBB scheduling schedules the first signals 1602 and 1612, and subsequently, another DCI format supporting URLLC scheduling schedules the first signals 1604 and 1614.

In an embodiment, the UE may report a UE capability of being able to simultaneously receive multiple first signals to the BS, and may perform at least one of the following operations when the BS sends down a higher signal configuration that allows simultaneous reception.

operation b-1: The UE expects to receive both 1602 and 1604 and transmit a second signal in response, in 1600.

operation b-2: The UE receives both 1612 and 1614 in 1610, and does not receive a resource overlapped by 1614 among resources allocated for 1612.

operation b-3: The UE receives both 1612 and 1614 in 1610, and does not receive all resources 1616 overlapped in time resource by 614 among resources allocated for 1612.

When the UE does not report a UE capability of being able to simultaneously receive multiple first signals to the BS, at least one of the following operations may be possible.

operation b-4: The UE does not receive scheduling as in 1600.

operation b-5: The UE does not receive scheduling as in 1610.

operation b-6: The UE may receive scheduling as in 1600, but skips processing of 1602 and only receives 1604. NACK is mapped and reported for 1602.

operation b-7: The UE expects scheduling as in 1600, but receives 1602 and 1604 in a TDM method. Specifically, 1604 is received in time region 1606 overlapping in time with 1602 and reception of 1602 is skipped.

operation b-8: The UE may receive scheduling as in 1600, but does not expect to receive 1602 from a point in time where reception of 1604 is started. Specifically, the UE receives 1602, but stops receiving 1602 from the point in time where reception of 1604 is started and receives 1604. Unlike operation b-7, even when the reception of 1604 is stopped, the UE does not resume reception of 1602.

operation b-9: The UE expects scheduling as in 1610, but skips processing of 1612 and only receives 1614. NACK is mapped and reported for 1612.

operation b-10: The UE expects scheduling as in 1610, but receives 1612 and 1614 in a TDM method. Specifically, 1614 is received in time region 1616 overlapping in time with 1612 and reception of 1612 is skipped.

operation b-11: The UE may receive scheduling as in 1610, but does not expect to receive 1612 from a point in time where reception of 1614 is started. Specifically, the UE receives 1612, but stops receiving 1612 from the point in time where reception of 1614 is started and receives 1614. Unlike operation b-10, even when the reception of 1614 is stopped, the UE does not resume reception of 1612.

In an embodiment, it is also possible to determine whether to accept 1600 and 1610 according to a control information configuration value related to transmitting DCI such as a particular DCI format, a CORESET, an RNTI, or the like. Specifically, in a situation where DCI 1 having DCI format A schedules 1602 (or 1612), the UE may not expect that DCI 2 having the same DCI format A schedules 1604 (or 1614). In a situation where DCI 1 having DCI format A schedules 1602 (or 1612), the UE may expect that DCI 2 having different DCI format B schedules 1604 (or 1614). Specifically, when DCI 1 having DCI format A schedules 1602 (or 1612), DCI 2 having the same DCI format is not accepted, but DCI 2 having a different DCI format may schedule 1604 (or 1614). Similarly, when 1602 (or 1612) is scheduled by DCI 1 detected in CORESET A (or search space A), scheduling 1604 (or 1614) is accepted not through DCI 2 detected in the same CORESET A (or search space A) but through DCI 2 detected in different CORESET B (or search space B). Similarly, when 1602 (or 1612) is scheduled in DCI 1 including CRC scrambled by RNTI A, scheduling 1604 (or 1614) is accepted not in different DCI 2 including CRC scrambled by the same RNTI A but in DCI 2 including CRC scrambled by different RNTI B. The aforementioned embodiments were described on the assumption that 1600 and 1610 of FIG. 16 are accepted for different CORESETs, different DCI formats, different search spaces, and different RNTIs, but when priorities are set between the CORESETs, the DCI formats, the search spaces, or RNTIs, DCI based on a CORESET, a DCI format, a search space, or an RNTI having higher priority may be the DCI 2 and DCI based on a CORESET, a DCI format, a search space, or an RNTI having lower priority may be the DCI 1. Setting the priorities may be separately specified in a standard, or priority values may also be determined by higher signal configuration. In an example of specifying the priority in the standard, for the RNTIs, an MCS-RNTI is always given higher priority than a C-RNTI. In an example of determining priority values by higher signal configuration, when the BS configures a higher signal related to a CORESET, a DCI format, or a search space, priority information is included and the BS may explicitly designate priority values in configuring the CORESET, the DCI format, or the search space.

In an embodiment, when the UE does not process or skips the scheduled PDSCH 1602 and the PDSCH 1612 in 1600 and 1610, the UE may report NACK for a corresponding HARQ-ACK resource, or may report information from a PHY layer to a higher layer that reception of a transport block transmitted on the PDSCH 1602 or the PDSCH 1612 has failed. Such an operation may be applied to a case that the UE is configured with transport block (TB) based retransmission, or to a case that the PDSCH 1602 and the PDSCH 1612 is scheduled in TB based retransmission. In another example, when the UE is configured with code block group (CBG) retransmission in a higher signal in 1600 and 1610, the UE may report HARQ-ACK information for each CBG without an extra mandated operation for the scheduled PDSCH 1602 and PDSCH 1612.

In an embodiment, in a case that HARQ-ACK information corresponding to the secondly scheduled PDSCH 1604 and PDSCH 1614 overlaps a PUSCH resource scheduled already or scheduled later, the UE transmits the HARQ-ACK information in the PUSCH when piggyback is enabled by higher signal configuration, and the UE drops the PUSCH transmission and transmits only the HARQ-ACK information in a PUCCH when piggyback is disabled. Alternatively, when HARQ-ACK information corresponding to the secondly scheduled PDSCH 1604 and PDSCH 1614 overlaps a PUSCH only in 1600 and 1610 without higher signal configuration, the UE always drops the PUSCH transmission and transmits the HARQ-ACK information on a PUCCH.

Figure 17:
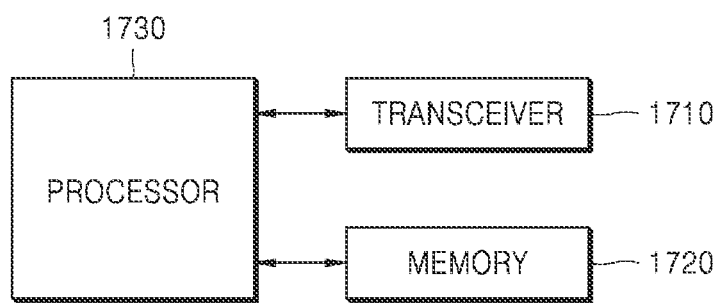
FIG. 17 is a block diagram illustrating an internal structure of a terminal, according to an embodiment.

FIG. 17 is a block diagram illustrating an internal structure of a UE, according to an embodiment.

Referring to FIG. 17, a UE may include a transceiver 1710, a memory 1720, and a processor 1730. The transceiver 1710, the memory 1720, and the processor 1730 of the UE may operate according to the aforementioned communication method of the UE. Components of the UE are not, however, limited thereto. For example, the UE may include more or fewer elements than described above. In addition, the transceiver 1710, the memory 1720, and the processor 1730 may be implemented in a single chip.

The transceiver 1710 may transmit or receive signals to or from the BS. The signals may include control information and data. To this end, the transceiver 1710 may include an RF transmitter for up-converting the frequency of a signal to be transmitted and amplifying the signal and an RF receiver for low-noise amplifying a received signal and down-converting the frequency of the received signal. It is merely an example of the transceiver 1710, and the elements of the transceiver 1710 are not limited to the RF transmitter and RF receiver.

In addition, the transceiver 1710 may receive a signal on a wireless channel and output the signal to the processor 1730, or transmit a signal output from the processor 1730 on a wireless channel.

The memory 1720 may store a program and data required for operation of the BS. Furthermore, the memory 1720 may store control information or data included in a signal obtained by the UE. The memory 1720 may include a storage medium such as a read only memory (ROM), a random access memory (RAM), a hard disk, a compact disc ROM (CD-ROM), and a digital versatile disc (DVD), or a combination of storage mediums.

The processor 1730 may control a series of processes for the UE to be operated according to the embodiments. In an embodiment, the processor 1730 may control to receive a first signal from a BS, determine whether an out-of-order HARQ occurs, determine a transmission time of a second signal in response to the first signal by considering an out-of-order HARQ when the out-of-order HARQ occurs, and transmit the second signal at the determined transmission time.

Figure 18:
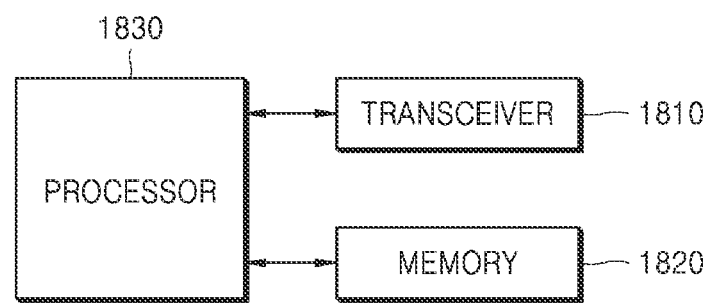
FIG. 18 is a block diagram illustrating an internal structure of a base station, according to an embodiment.

FIG. 18 is a block diagram illustrating the structure of a BS, according to an embodiment.

Referring to FIG. 18, a BS may include a transceiver 1810, a memory 1820, and a processor 1830. The transceiver 1810, the memory 1820, and the processor 1830 of the BS may operate according to the aforementioned communication method of the BS. Components of the BS are not, however, limited thereto. For example, the BS may include more or fewer elements than described above. In addition, the transceiver 1810, the memory 1820, and the processor 1830 may be implemented in a single chip.

The transceiver 1810 may transmit or receive signals to or from a UE. The signals may include control information and data. To this end, the transceiver 1810 may include an RF transmitter for up-converting the frequency of a signal to be transmitted and amplifying the signal and an RF receiver for low-noise amplifying a received signal and down-converting the frequency of the received signal. It is merely an example of the transceiver 1810, and the elements of the transceiver 1810 are not limited to the RF transmitter and RF receiver.

In addition, the transceiver 1810 may receive a signal on a wireless channel and output the signal to the processor 1830, or transmit a signal output from the processor 1830 on a wireless channel.

The memory 1820 may store a program and data required for an operation of the BS. Furthermore, the memory 1820 may store control information or data included in a signal obtained by the BS. The memory 1820 may include a storage medium such as a ROM, a RAM, a hard disk, a CD-ROM, and a DVD, or a combination of storage mediums.

The processor 1830 may control a series of processes for the BS to be operated according to the embodiments of the disclosure.

Methods according to the claims of the disclosure or the embodiments described in the specification may be implemented in hardware, software, or a combination of hardware and software.

When implemented in software, a computer-readable storage medium storing one or more programs (software modules) may be provided. The one or more programs stored in the computer-readable storage medium are configured for execution by one or more processors in an electronic device. The one or more programs may include instructions that cause the electronic device to perform the methods in accordance with the claims of the disclosure or the embodiments described in the specification.

The programs (software modules, software) may be stored in a random access memory (RAM), a non-volatile memory including a flash memory, a read only memory (ROM), an electrically erasable programmable ROM (EEPROM), a magnetic disc storage device, a compact disc-ROM (CD-ROM), a digital versatile disc (DVD) or other types of optical storage device, and/or a magnetic cassette. Alternatively, the programs may be stored in a memory including a combination of some or all of them. There may be a plurality of memories.

The program may also be stored in an attachable storage device that may be accessed over a communication network including the Internet, an intranet, a LAN, a wide LAN (WLAN), or a storage area network (SAN), or a combination thereof. The storage device may be connected to an apparatus performing the embodiments of the disclosure through an external port. In addition, a separate storage device in the communication network may be connected to the apparatus performing the embodiments of the disclosure.

In the embodiments of the disclosure, a component is represented in a singular or plural form. It should be understood, however, that the singular or plural representations are selected appropriately according to the situations presented for convenience of explanation, and the disclosure is not limited to the singular or plural form of the component. Further, the component expressed in the plural form may also imply the singular form, and vice versa.

Several embodiments have been described above, but a person of ordinary skill in the art will understand and appreciate that various modifications can be made without departing the scope of the present disclosure. Thus, it will be apparent to those ordinary of skill in the art that the disclosure is not limited to the embodiments described, which have been provided only for illustrative purposes. Furthermore, the embodiments of the disclosure may be operated by being combined with one another if necessary. For example, an embodiment of the disclosure and some of another embodiment of the disclosure may be combined to operate the BS and the UE. Although the embodiments of the disclosure are proposed based on a frequency division duplex (FDD) LTE system, modifications to the embodiments of the disclosure, which do not deviate from the scope of the disclosure, may be applicable to other systems such as a time division duplex (TDD) LTE system, a 5G or NR system, or the like.

The invention claimed is:

1. A method performed by a terminal in a wireless communication system, the method comprising:
   identifying a first downlink control on a first control resource set (CORESET);
   identifying a second downlink control on a second CORESET;
   receiving a first physical downlink shared channel (PDSCH) based on the first downlink control, wherein the first PDSCH is associated with a hybrid automatic repeat request acknowledgement (HARQ-ACK) to be transmitted in a first slot; and
   receiving a second PDSCH starting later than the first PDSCH based on the second downlink control, in case that the first CORESET and the second CORESET are different, wherein the second PDSCH is associated with a HARQ-ACK to be transmitted in a second slot before the first slot.

2. The method of claim 1,
   wherein the first PDSCH and the second PDSCH are fully or partially overlapped in at least one of a time domain and a frequency domain.

3. The method of claim 1,
   wherein, in case that the first CORESET and the second CORESET are identical, the receiving of the second PDSCH starting later than the first PDSCH is not allowed.

4. The method of claim 1, further comprising:
   transmitting capability information regarding an out of order operation.

5. The method of claim 1, wherein receiving the second PDSCH starting later than the first PDSCH includes:
   receiving a start orthogonal frequency division multiplexing (OFDM) symbol of the second PDSCH later than a start OFDM symbol of the first PDSCH.

6. The method of claim 1,
   wherein a HARQ process for the first PDSCH has a lower index than a HARQ process for the second PDSCH.

7. A terminal in a wireless communication system, the terminal comprising:
   a transceiver configured to transmit or receive a signal; and
   a processor configured to control the transceiver to:
   identify a first downlink control on a first control resource set (CORESET);
   identify a second downlink control on a second CORESET;
   receive a first physical downlink shared channel (PDSCH) based on the first downlink control, wherein the first PDSCH is associated with a hybrid automatic repeat request acknowledgement (HARQ-ACK) to be transmitted in a first slot; and
   receive a second PDSCH starting later than the first PDSCH based on the second downlink control, in case that the first CORESET and the second CORESET are different, wherein the second PDSCH is associated with a HARQ-ACK to be transmitted in a second slot before the first slot.

8. The terminal of claim 7,
   wherein the first PDSCH and the second PDSCH are fully or partially overlapped in at least one of a time domain and a frequency domain.

9. The terminal of claim 7,
   wherein, in case that the first CORESET and the second CORESET are identical, the receiving of the second PDSCH starting later than the first PDSCH is not allowed.

10. The terminal of claim 7,
    wherein the processor is further configured to control the transceiver to transmit capability information regarding an out of order operation.

11. The terminal of claim 7, wherein the receiving of the second PDSCH starting later than the first PDSCH includes:
    receiving a start orthogonal frequency division multiplexing (OFDM) symbol of the second PDSCH later than a start OFDM symbol of the first PDSCH.

12. The terminal of claim 7,
    wherein a HARQ process for the first PDSCH has a lower index than a HARQ process for the second PDSCH.

13. A method performed by a base station in a wireless communication system, the method comprising:
    transmitting, to a terminal, a first downlink control on a first control resource set (CORESET);
    transmitting, to the terminal, a second downlink control on a second CORESET;
    transmitting, to the terminal, a first physical downlink shared channel (PDSCH) based on the first downlink control, wherein the first PDSCH is associated with a hybrid automatic repeat request acknowledgement (HARQ-ACK) to be transmitted in a first slot; and
    transmitting, to the terminal, a second PDSCH starting later than the first PDSCH based on the second downlink control, in case that the first CORESET and the second CORESET are different, wherein the second PDSCH is associated with a HARQ-ACK to be transmitted in a second slot before the first slot.

14. The method of claim 13,
    wherein the first PDSCH and the second PDSCH are fully or partially overlapped in at least one of a time domain and a frequency domain.

15. The method of claim 13,
    wherein, in case that the first CORESET and the second CORESET are identical, the transmitting of the second PDSCH starting later than the first PDSCH is not allowed.

16. The method of claim 13, further comprising:
    receiving, from the terminal, capability information regarding an out of order operation.

17. The method of claim 13, wherein transmitting the second PDSCH starting later than the first PDSCH includes:

transmitting a start orthogonal frequency division multiplexing (OFDM) symbol of the second PDSCH later than a start OFDM symbol of the first PDSCH.

18. The method of claim 13,
wherein a HARQ process for the first PDSCH has a lower index than a HARQ process for the second PDSCH.

\* \* \* \* \*